(12) United States Patent
Wu et al.

(10) Patent No.: US 10,199,935 B2
(45) Date of Patent: Feb. 5, 2019

(54) HYBRID BOOSTING CONVERTERS

(71) Applicant: The Regents of the University of California, Oakland, CA (US)

(72) Inventors: Bin Wu, Irvine, CA (US); Keyue Smedley, Aliso Viejo, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/510,546

(22) PCT Filed: Sep. 11, 2015

(86) PCT No.: PCT/US2015/049738
§ 371 (c)(1),
(2) Date: Mar. 10, 2017

(87) PCT Pub. No.: WO2016/040832
PCT Pub. Date: Mar. 17, 2016

(65) Prior Publication Data
US 2017/0310241 A1 Oct. 26, 2017

Related U.S. Application Data

(60) Provisional application No. 62/049,655, filed on Sep. 12, 2014.

(51) Int. Cl.
*H02M 7/25* (2006.01)
*H02M 3/156* (2006.01)
(Continued)

(52) U.S. Cl.
CPC ............. *H02M 3/156* (2013.01); *H02M 7/25* (2013.01); *H02M 3/07* (2013.01); *H02M 3/33507* (2013.01)

(58) Field of Classification Search
CPC .................................................... H02M 3/156
See application file for complete search history.

(56) References Cited

U.S. PATENT DOCUMENTS 5,130,610 A * 7/1992 Kakitani ................ H05B 41/28
315/219
2008/0298093 A1* 12/2008 Jin ........................ H02M 3/285
363/21.06
(Continued)

FOREIGN PATENT DOCUMENTS

WO 2012088641 A1 7/2012

OTHER PUBLICATIONS

Shahid, Iqbal & Besar, Rosli. (2007). "A Bipolar Cockcroft-Walton Voltage Multiplier for Gas Lasers." American Journal of Applied Sciences.*
(Continued)

*Primary Examiner* — Gary L Laxton
*Assistant Examiner* — Peter Novak
(74) *Attorney, Agent, or Firm* — Thomas | Horstemeyer, LLP

(57) ABSTRACT

Various examples are provided for hybrid boosting converters (HBCs). In one example, a HBC includes an inductive switching core and a bipolar voltage multiplier (BVM) coupled to the inductive switching core. In another example, a HBC micro-inverter includes an inductive switching core coupled to an input voltage; a BVM comprising a positive branch and a negative branch coupled to the inductive switching core; and a switched bridge coupled across the positive and negative branches of the BVM. In another example, a 3D HBC includes a common axis comprising a series of capacitors; and a plurality of parallel wings coupled to the common axis. The parallel wings form a BVM when coupled to the common axis and include an inductive switching core that is coupled to an input voltage. The
(Continued)

common axis can include a single input voltage or multiple input voltages can be coupled through the wings.

21 Claims, 21 Drawing Sheets

(51) Int. Cl.
*H02M 3/07* (2006.01)
*H02M 3/335* (2006.01)

(56) References Cited

U.S. PATENT DOCUMENTS

| | | |
|---|---|---|
| 2010/0027297 A1 | 2/2010 | Avrutsky et al. |
| 2012/0112550 A1 | 5/2012 | Schill |
| 2013/0119966 A1 | 5/2013 | Touzani et al. |
| 2013/0135903 A1 | 5/2013 | Fu et al. |
| 2014/0183953 A1* | 7/2014 | Harrison ............... H02J 3/385 307/52 |

OTHER PUBLICATIONS

International Search Report for PCT/US2015/049738 dated Dec. 18, 2015.

\* cited by examiner

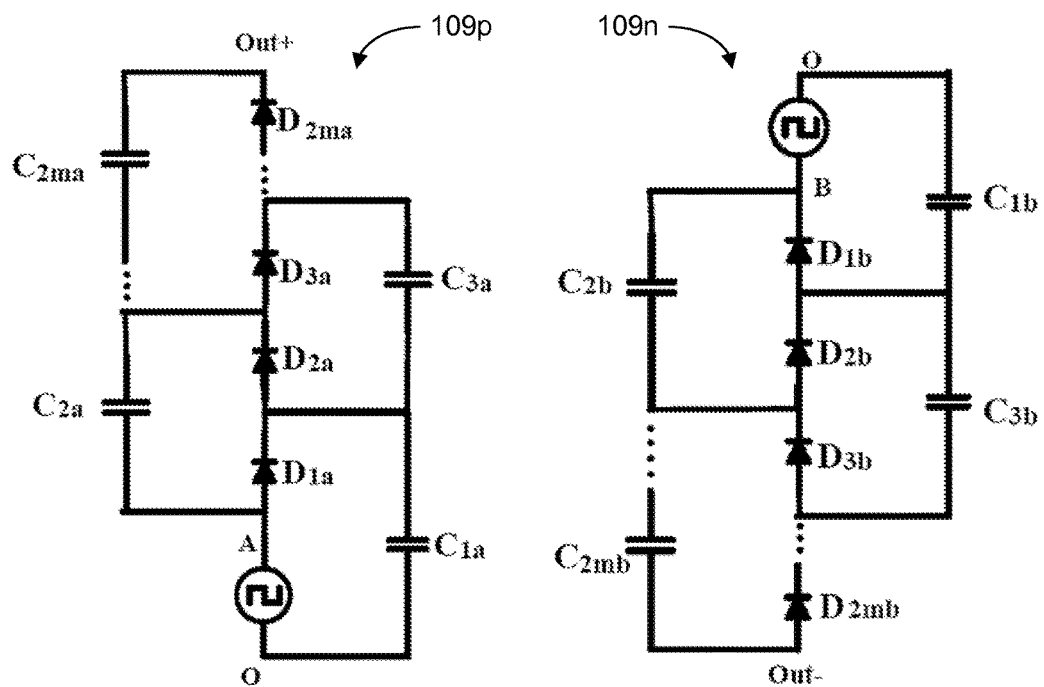
FIG. 3A  FIG. 3B
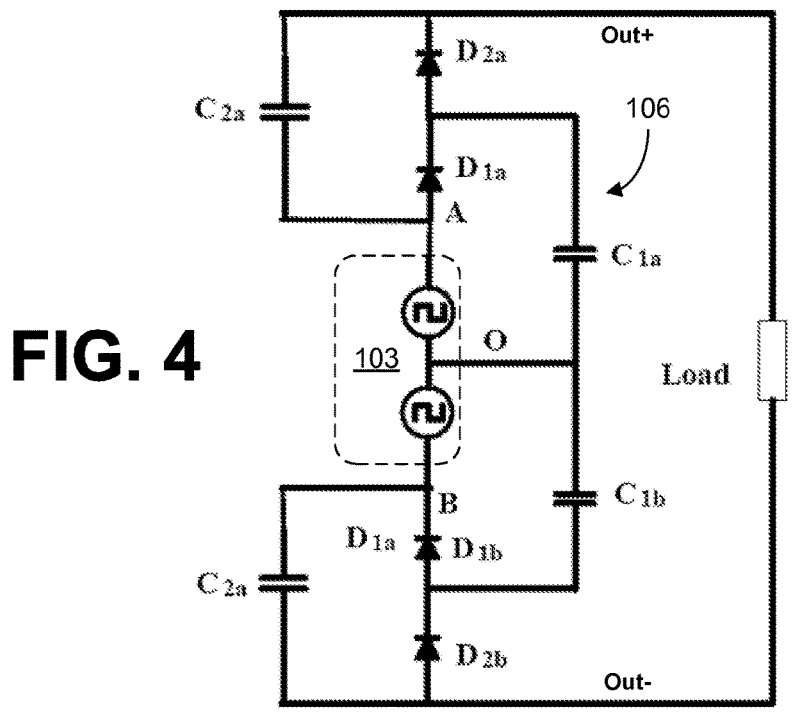
FIG. 4

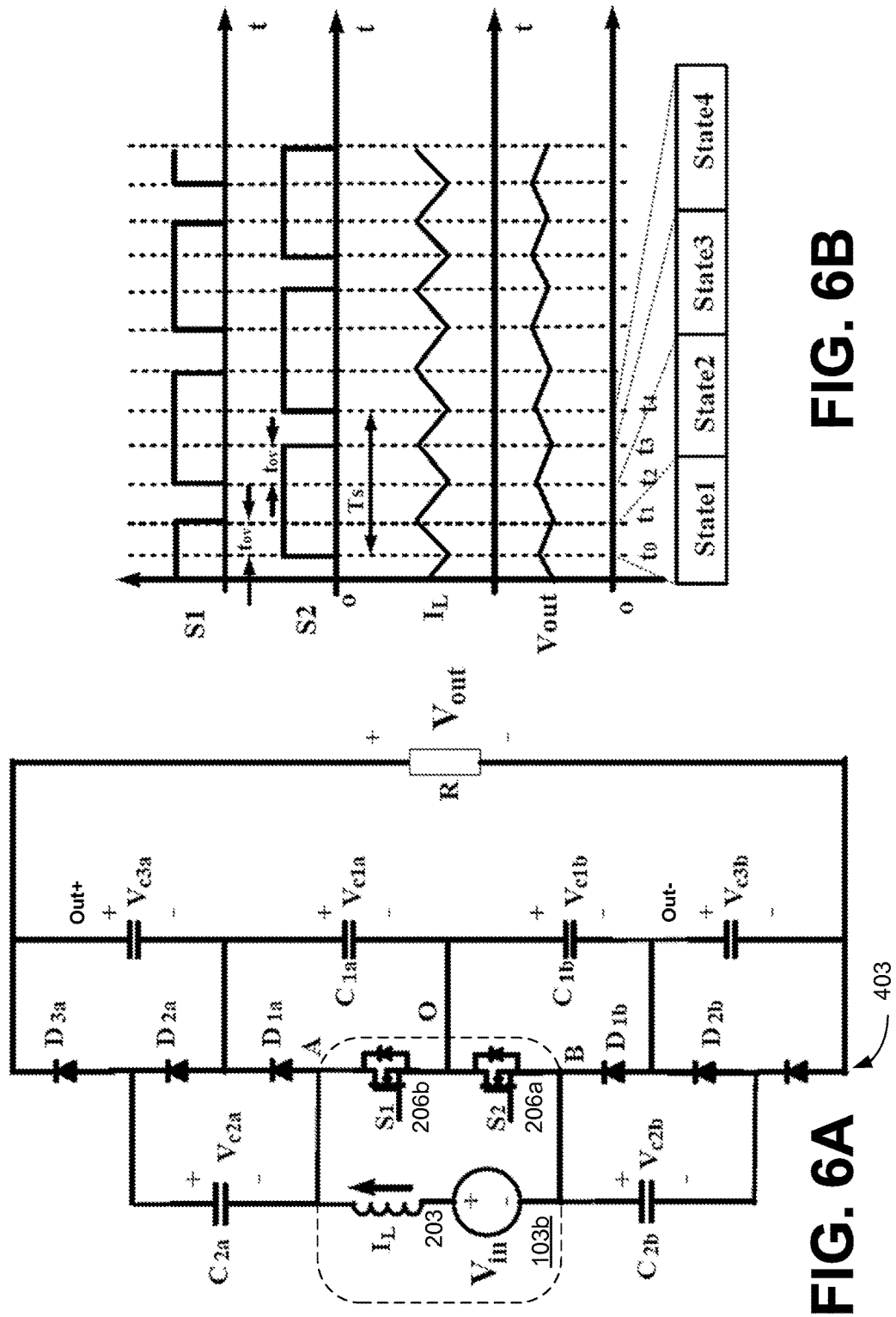

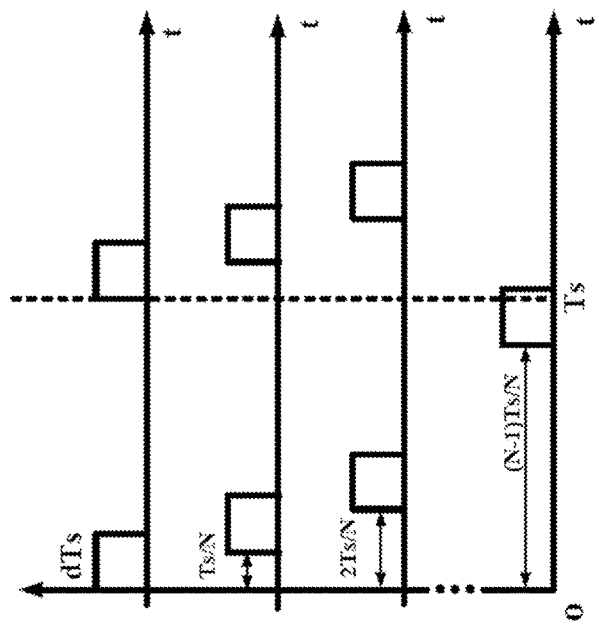
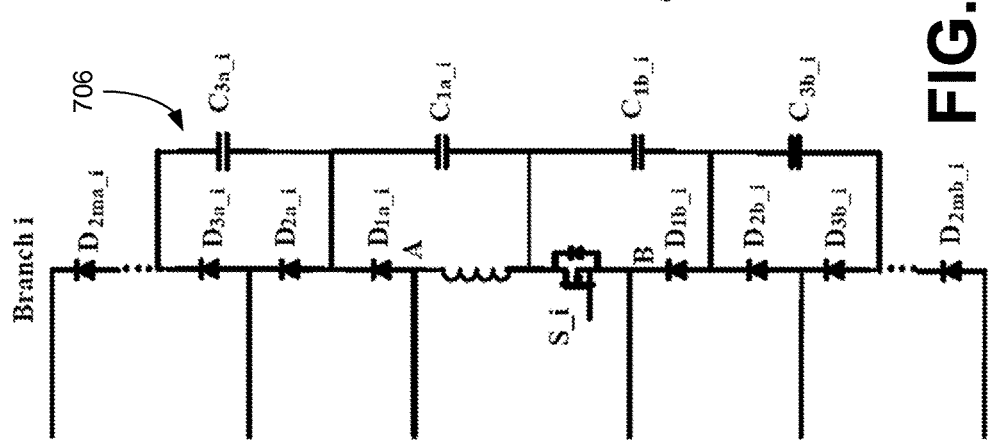
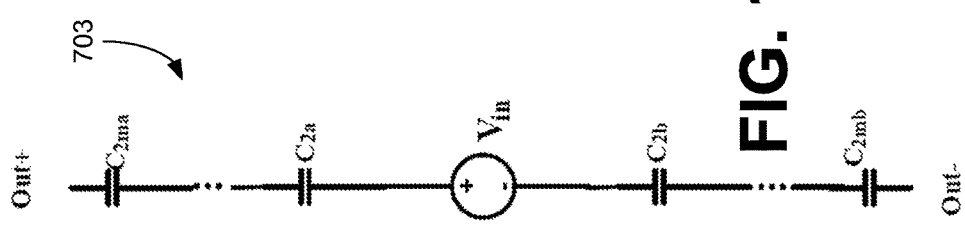
FIG. 10B
FIG. 10C
FIG. 10D

HYBRID BOOSTING CONVERTERS

CROSS REFERENCE TO RELATED APPLICATIONS

This application is the 35 U.S.C. § 371 national stage application of PCT Application No. PCT/FI2013/051072, filed Nov. 13, 2013, where the PCT claims priority to, and the benefit of, U.S. provisional application entitled "Hybrid Boosting Converters" having Ser. No. 62/049,655, filed Sep. 12, 2014, both of which are herein incorporated by reference in their entireties.

BACKGROUND

Applications increasingly demand DC-DC converters with high gains of 10× or higher in addition to high efficiency, high power, and wide regulation capability. The traditional boost has found its application when the voltage gain is moderate. However, as the voltage gain increases to greater than four, the duty cycle of the boost converter will approach one, leading to the freewheel diode operating in a high current and narrow pulse condition. Thus, the recovery loss and conduction loss will both increase dramatically, while the regulation margin will be limited.

SUMMARY

Embodiments of the present disclosure are related to hybrid boost converters (HBCs), which can be used as high gain power converters. The HBCs include inductive switching cores of various functionalities and control strategies that are integrated with a bipolar voltage multiplier (BVM) to form various HBCs. The HBCs include features in symmetrical configuration, low component voltage rating, small output voltage ripple, and expendable structure. Examples include basic, symmetrical, isolated, and tapped-inductor configurations. Additionally, various configurations can be extended for bidirectional power delivery, to implement 3D structures for high power delivery, micro-inverter configurations for DC/AC applications, and for DC microgrid applications. The proposed HBC family is suitable in many areas of applications such as HID lamp driver, X-ray system, ion pumps, front-end photovoltaic energy system, energy storage systems, micro-inverter, and DC power distribution.

In one embodiment, among others, a hybrid boost converter (HBC) comprises an inductive switching core, and a bipolar voltage multiplier (BVM) comprising a positive branch and a negative branch coupled to the inductive switching core. The inductive switching core can be an inductor-switch (LS) core comprising an inductor and a switch coupled across an input voltage ($V_{in}$). The inductive switching core can be an inductor-double switch (LSS) core comprising an inductor, a first switch and a second switch coupled across an input voltage ($V_{in}$). The inductive switching core can be a transformer-switch-diode (TSD) core comprising a primary side of a transformer coupled to an input voltage ($V_{in}$) and a secondary side of the transformer coupled to the BVM. The primary side of the transformer and a switch can be coupled across the input voltage. The primary side of the transformer can be coupled to the input voltage via a switched half-wave bridge. A switched resonant circuit can be coupled to the input voltage via a switched resonant circuit, the switched resonant circuit including the primary side of the transformer. The primary side of the transformer can be coupled to the input voltage via a switched full-wave bridge.

In one or more aspect of these embodiments, the inductive switching core can be a tapped-inductor-switch (TLS) core comprising a first portion of a tapped-inductor winding and a switch coupled across an input voltage ($V_{in}$). A second portion of the tapped-inductor winding can be coupled between the switch and a common point between the positive branch and the negative branch. The BVM can comprise equal numbers of capacitors and diodes. The BVM can be an odd-order BVM or an even-order BVM. The BVM can comprise equal numbers of capacitors and switches. An input voltage (Vin) can be coupled between the positive and negative branches of the BVM and a load can be coupled to the inductive switching core. The BVM can comprise a number (X) of capacitors, a number (Y) of diodes and a number (Z) of switches, where the number of capacitors equals the number of diodes plus the number of switches (X=Y+Z).

In another embodiment, a single-input three-dimensional (3D) HBC includes a common axis comprising a first series of capacitors coupled between a first connection of an input voltage ($V_{in}$) and a first output connection and a second series of capacitors coupled between a second connection of the input voltage and a second output connection; and a plurality of parallel branches coupled to the common axis, each branch of the plurality of parallel branches forming a bipolar voltage multiplier (BVM) when coupled to the common axis and comprising an inductive switching core that is coupled across the input voltage. The to inductive switching core can be an inductor-switch (LS) core comprising an inductor and a switch coupled across the input voltage. The inductive switching core can be a tapped-inductor-switch (TLS) core comprising a first portion of a tapped-inductor winding and a switch that are coupled across the input voltage. A second portion of the tapped-inductor winding can be coupled between the switch and a common point that is between a positive branch and a negative branch of the BVM.

In another embodiment, a distributed-input 3D HBC includes a common axis comprising a series of capacitors including a plurality of output connections across one or more of the capacitors; a first wing coupled to the common axis, the first wing forming a bipolar voltage multiplier (BVM) when coupled to the common axis and comprising a first inductive switching core that is coupled to a first input voltage; and a second wing coupled to the common axis in parallel with the first wing, the second wing forming a BVM when coupled to the common axis and comprising a second inductive switching core that is coupled to a second input voltage.

In another embodiment, a HBC micro-inverter comprises an inductive switching core coupled to an input voltage; a bipolar voltage multiplier (BVM) comprising a positive branch and a negative branch coupled to the inductive switching core; and a switched bridge coupled across the positive and negative branches of the BVM. The HBC micro-inverter can also comprise a series of capacitors coupled across the input voltage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B are schematic diagrams illustrating examples of positive and negative branches of a bipolar voltage multiplier (BVM) used in the HBCs of FIGS. 1A and 1B in accordance with various embodiments of the present disclosure.

FIG. 4 is a schematic diagram illustrating an example of a second-order BVM in accordance with various embodiments of the present disclosure.

FIG. 6A is a schematic diagram illustrating an example of a third-order symmetrical HBC in accordance with various embodiments of the present disclosure.

FIG. 6B illustrates examples of operational characteristics of the symmetrical HBC of FIG. 6A in accordance with various embodiments of the present disclosure.

FIGS. 10A through 10C are schematic diagrams illustrating an example of a three-dimensional (3D) basic HBC in accordance with various embodiments of the present disclosure.

FIG. 10D illustrates switch timing of the 3D basic HBC of FIGS. 10A-10C in accordance with various embodiments of the present disclosure.

DETAILED DESCRIPTION

Figure 1A:
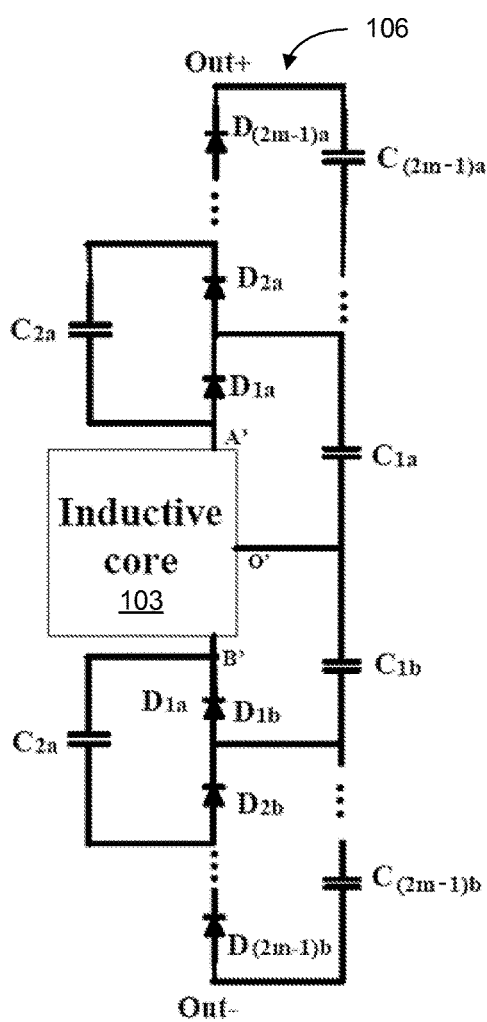
FIGS. 1A and 1B are schematic diagrams of examples of odd-order and even-order hybrid boost converters (HBCs) in accordance with various embodiments of the present disclosure.

Disclosed herein are various embodiments related to hybrid boosting converters (HBCs). A group of inductive switching cores of various functionalities and control strategies can be organically combined with a bipolar voltage multiplier (BVM), yielding a new family of HBCs, which can include low component voltage ratings, small output voltage ripple, symmetrical configurations, and/or expandable structures. Various HBC designs include basic, symmetrical, isolated, and tapped-inductor embodiments. The HBC embodiments can be extended for bi-directional power delivery, a single-input three-dimensional (3D) structure for high power delivery, a distributed-input three-dimensional (3D) structure for DC micro-grid, and/or a half-bridge micro-inverter configuration for DC/AC (direct current/alternating current) conversion. HBCs can be utilized in various applications such as, but not limited to, high intensity discharge (HID) lamp drivers, x-ray systems, ion pumps, front-end photovoltaic energy systems, and energy storage systems. Reference will now be made in detail to the description of the embodiments as illustrated in the drawings, wherein like reference numbers indicate like parts throughout the several views.

Figure 1B:
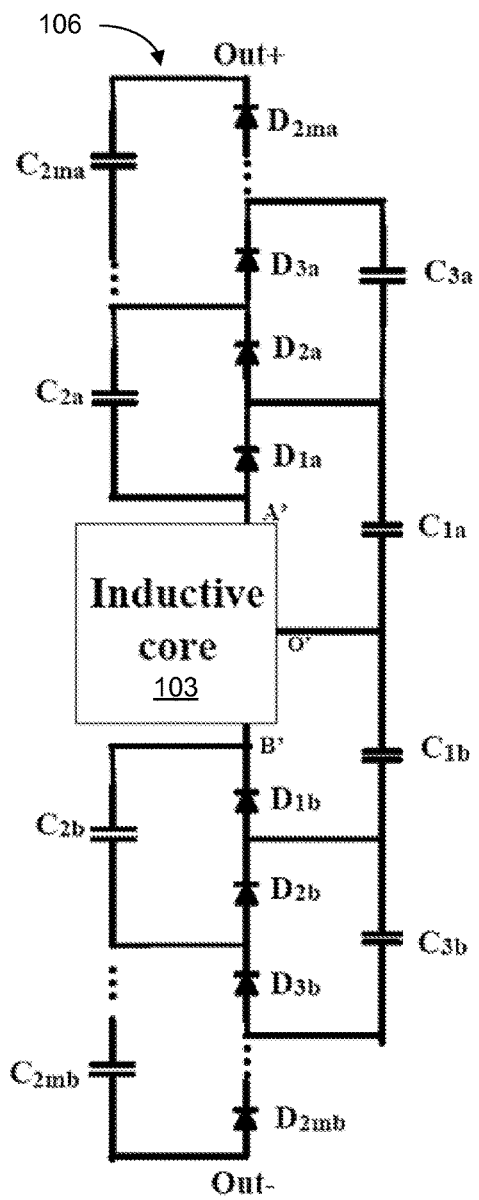

Referring now to FIGS. 1A and 1B, the HBCs include an inductive switching core 103 which pumps energy from an energy source to the BVM 106. FIG. 1A is a schematic diagram illustrating an example of an odd-order (2m−1) HBC and FIG. 1B is a schematic diagram illustrating an example of an even-order (2m) HBC.

Inductive Switching Cores

As shown in FIGS. 1A and 1B, the inductive switching core 103 is a three terminal network (A', B' O') that comprises an electric energy source, one or more magnetic component (e.g., inductor, tapped-inductor, transformer, etc.), and one or more switches. The inductive switching core 103 pumps electrical charge to the BVM 106 for a voltage boosting purpose due to the "on" and "off" operation of the active switches.

Figure 2:
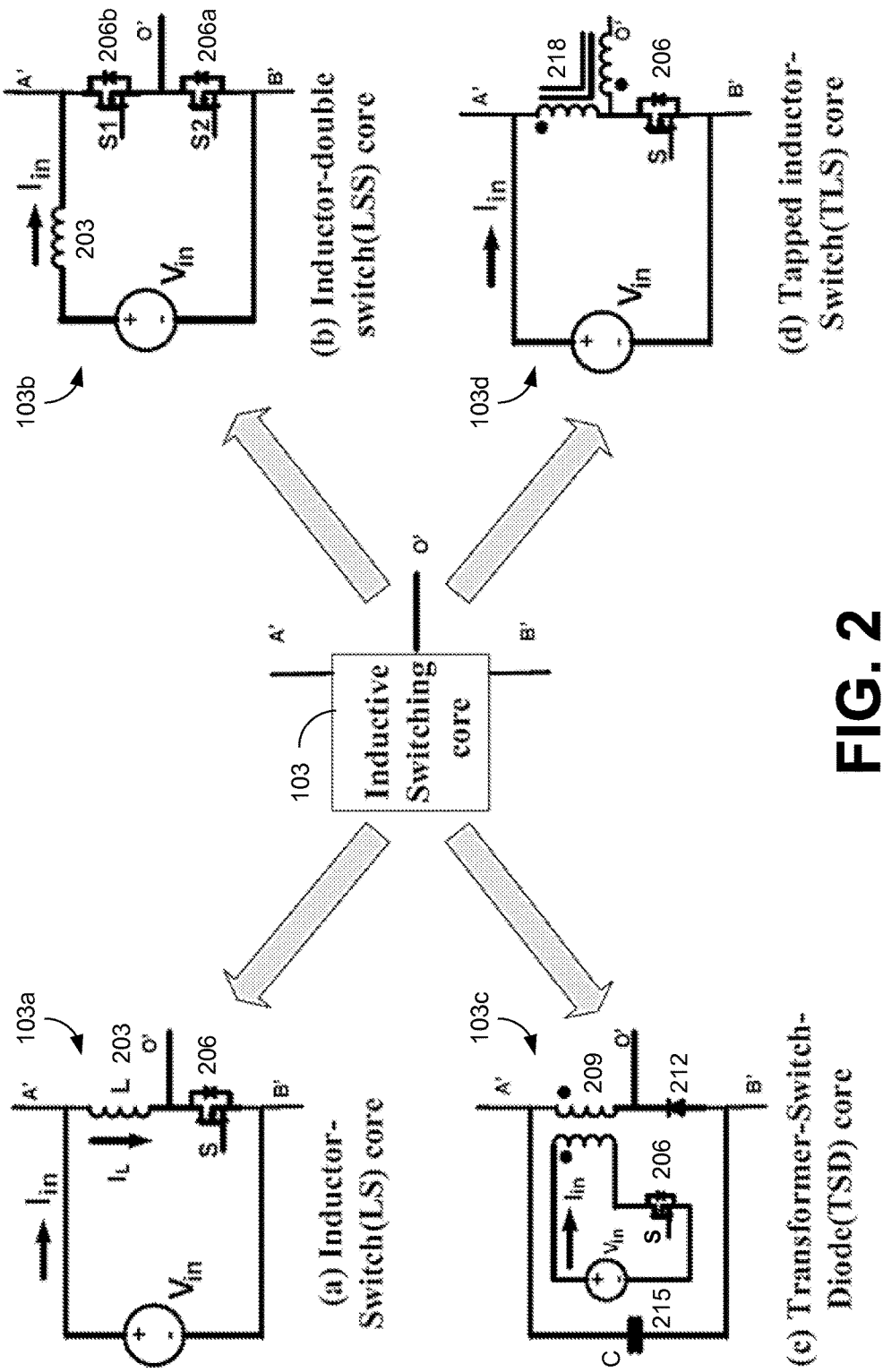
FIG. 2 includes schematic diagrams of examples of inductive cores that can be used in the HBCs of FIGS. 1A and 1B in accordance with various embodiments of the present disclosure.

Four embodiments of the inductive switching core 103 are graphically illustrated in FIG. 2 with elements including, but not limited to, a switch (S), diode (D), inductor (L), tapped-inductor (TL) and/or transformer (T). FIG. 2(*a*) shows an inductor-switch (LS) core 103*a*, FIG. 2(*b*) shows an inductor-double switch (LSS) core 103*b*, FIG. 2(*c*) shows a transformer-switch-diode (TSD) core 103*c* and FIG. 2(*d*) shows a tapped inductor-switch (TLS) core 103*d*. The output terminals A', O' and B' of the inductive switching cores 103 can be connected to the input terminals A, O, B of a BVM 106.

The different inductive switching cores 103, when equipped with the BVM 106, can achieve different functionalities. A brief comparison of the various embodiments is given in TABLE 1. Being connected to the BVM 106, the LS core 103*a*, which includes an inductor 203 and a switch 206, is used in the basic HBC, which is suitable for handling low power with medium gain. The symmetrical HBC with the LSS core 103*b*, which includes an inductor 203 and two switches 206*a* and 206*b*, is useful for applications that need a smooth input current where the regulation range is not too wide. The isolated HBC with the TSD core 103*c*, which includes a switch 206, a transformer 209, a diode 212 and a capacitor 215, can be used when galvanic isolation is desired. The tapped-inductor HBC with TLS core 103*d*, which includes a switch 206 and a tapped inductor 218, is suitable for super high gain applications with high power needs.

TABLE 1

Comparison of inductive switching cores.

| Inductive switching cores | Corresponding HBC | Pros | Cons | Suitable BVMs |
|---|---|---|---|---|
| LS core | Basic | Simplest | Pulsing input current | Odd/Even |
| LSS core | Symmetrical | Continuous input current | Two active switches, narrower regulation range | Odd |
| TSD core | Isolated | Isolation | Pulsing input current, leakage | Odd/Even |
| TLS core | Tapped-Inductor | High gain, shaped input current | Leakage | Odd/Even |

Bipolar Voltage Multiplier (BVM)

A BVM includes two symmetrical branches: the positive branch 109*p* and the negative branch 109*n*, as shown in FIGS. 3A and 3B, respectively. The input of a BVM 106 has three terminals, A, B and O, which can be connected with the three matching terminals (A', B' and O' respectively) of the inductive switching core 103. The BVM 106 can be classified as an odd-order BVM 106 or an even-order BVM 106 as illustrated in FIGS. 1A and 1B, respectively. The odd-order BVM 106 comprises capacitors $C_{ia}$ (i=1, 2, ..., 2m−1) and diodes $D_{ia}$ (i=1, 2, ..., 2m−1) in the positive branch, and capacitors $C_{ib}$ (i=1, 2, ..., 2m−1) and diodes $D_{ib}$ (i=1, 2, ..., 2m−1) in the negative branch. The even-order BVM 106 comprises capacitors $C_{ia}$ (i=1, 2, ..., 2m) and diodes $D_{ia}$ (i=1, 2, ..., 2m) in the positive branch, and capacitors $C_{ib}$ (i=1, 2, ..., 2m) and diodes $D_{ib}$ (i=1, 2, ..., 2m) in the negative branch. Note that the order of a BVM 106 is consistent with its positive multiplier branch 109*p*. For example, the positive voltage multiplier branch 109*p* in FIG. 3A has a $2m^{th}$ order since it comprises 2m flying capacitors, which leads to a corresponding $2m^{th}$ order BVM 106 when the negative branch 109*n* (FIG. 3B) is added.

Operation Principals of Hybrid Boosting Converters

In order to illustrate the operational principal of each HBC, a second-order BVM 106, as illustrated in FIG. 4, was selected to connect with the LS 103*a*, TSD 103*c*, and TLS 103*d* cores, respectively. The LSS core 103*b*, which is only suitable for an odd-order BVM 106, was connected to a third-order BVM 106 leading to a third-order symmetrical HBC. All the topologies generated and their voltage gains will be discussed in following sections.

The Basic HBC.

Figures 5A, 5B:
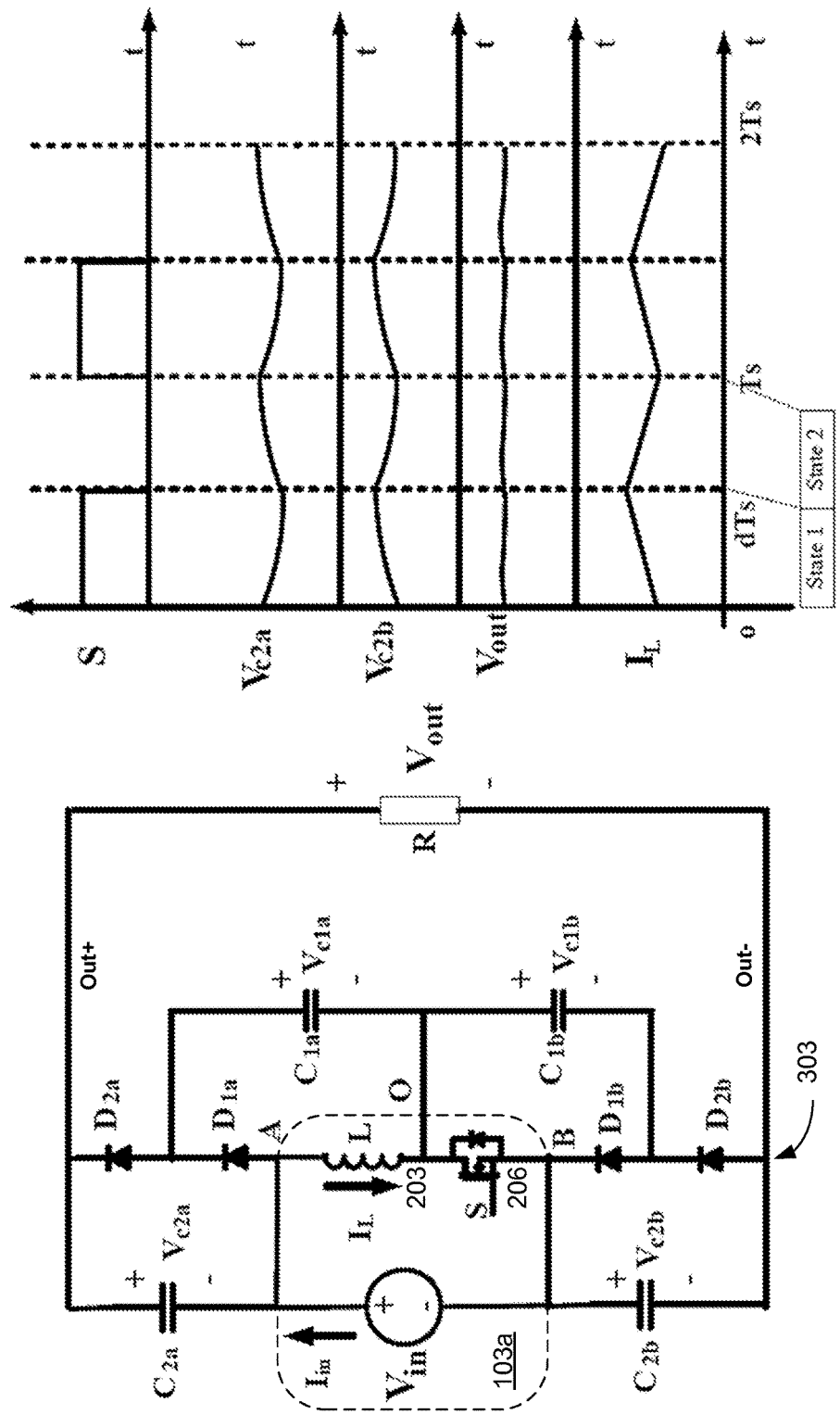
FIG. 5A is a schematic diagram illustrating an example of a second-order basic HBC in accordance with various embodiments of the present disclosure.
FIGS. 5B through 5D illustrate examples of operational characteristics of the basic HBC of FIG. 5A in accordance with various embodiments of the present disclosure.

A basic HBC can be implemented by combining a basic boost converter including an inductor and switch with an even-order or odd-order BVM 106. The resulting basic HBC topology features a simple circuit, easy regulation, low component ratings and high efficiency. Referring to FIG. 5A, shown is an example of a second order basic HBC 303. The basic HBC 303 has the benefit of a wide regulation range from the boost converter and a high gain boosting capability from the BVM 106. A Pulse Width Modulation (PWM) control strategy can be adopted for the basic HBC 303. The control circuit can be the same as that used in a traditional boost converter.

Referring to FIG. 5B, shown are examples of the continuous conduction mode (CCM) operation waveforms. The capacitor voltage waveforms ($V_{c2a}$ and $V_{c2b}$) are zoomed in to illustrate the voltage ripple detail. Note that the voltage ripples of capacitors $C_{2a}$ and $C_{2b}$ are interleaved; therefore the ripple of the output voltage ($V_{out}$) is expected to be much smaller than the ripple seen on each capacitor. The control signal (S) for the different states of the switch 206 and the resulting inductor current ($I_L$) are also shown.

Assuming that all of the components in the basic HBC 303 are ideal and that the flying capacitors ($C_{1a}$ and $C_{1b}$) are large enough, the voltage of the flying capacitors can be considered constant in steady state analysis. Furthermore, assuming that the switching capacitors ($C_{2a}$ and $C_{2b}$) get fully charged during each operation stage, the voltage gain under the CCM mode can be obtained from the ratio of the output voltage ($V_{out}$) to the input voltage ($V_{in}$) as follows:

$$\frac{V_{out}}{V_{in}} = \frac{3-D}{1-D}, \tag{1}$$

where D is the duty cycle of the control signal (S).

Figure 5C:
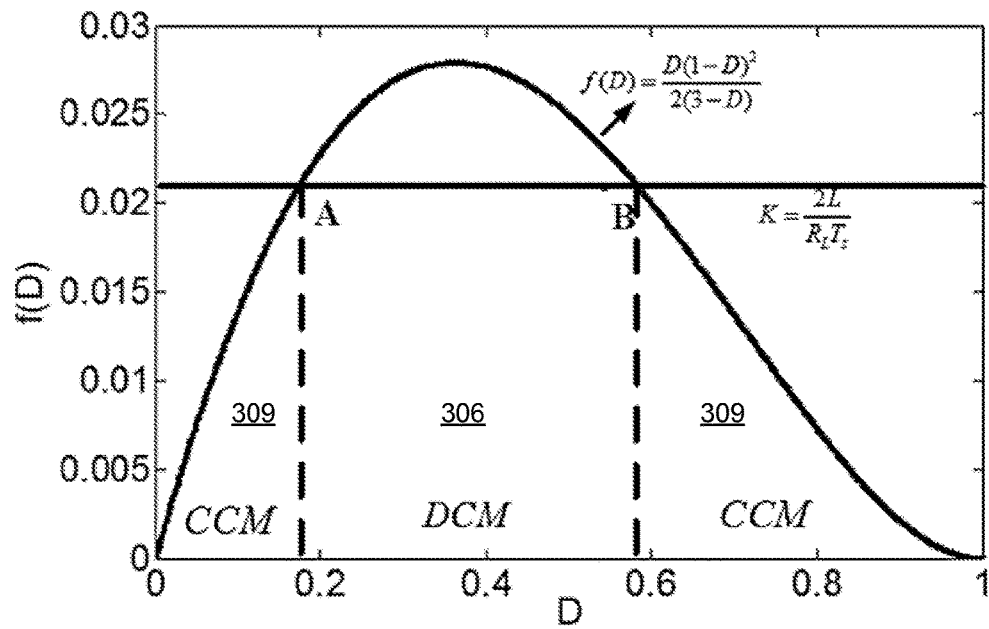

To guarantee the CCM operation mode of the second-order basic HBC 303 of FIG. 5A, the following criteria can be met:

$$\frac{D(1-D)^2}{2(3-D)} < \frac{2L}{RT_s}, \tag{2}$$

where L is the inductance of the inductor 203, R is the resistance of the load, and $T_s$ is the switching period as shown in FIG. 5B. The criteria is illustrated in FIG. 5C, where the horizontal curve shows the design parameter $K=2L/RT_s$, which can be calculated by inductor, load and switching period. If K is larger than the peak value of f(D), then the entire duty cycle range from 0 to 1 yields CCM operation mode. If curve K intersects with f(D) at two points A and B, as shown in FIG. 5C, the duty cycle range will be divided into three regions. The middle region 306 of duty cycle will lead the converter to operate in discontinuous conduction mode (DCM), while other two regions 309 on both sides result in CCM operation of the basic HBC 303.

Figure 5D:
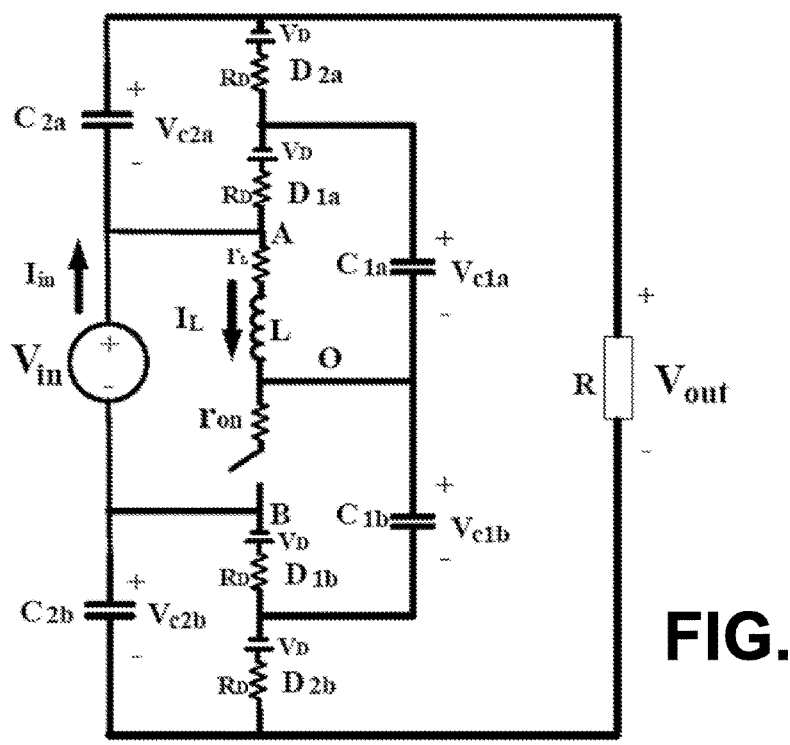

In order to analyze the circuit losses, the inductor winding resistance $r_L$ and switch on-resistance $r_{on}$ can be taken into account while the equivalent series resistance (ESR) of the capacitors can be neglected. The diode is modeled as a resistor $R_D$ in series with a voltage source $V_D$. FIG. 5D illustrates an example of the equivalent circuit of the second-order basic HBC 303 with consideration of the conduction losses. The equation for the efficiency of the second-order basic HBC 303 can be derived as follows:

$$\eta = \frac{\frac{4V_D(1-D)}{V_{in}(3-D)}}{1+\frac{4(r_{on}+r_L)}{R(1-D)^2}+\frac{2R_D}{R(1-D)}}. \tag{3}$$

The Symmetrical HBC.

The LSS core 103b (FIG. 2) used in a symmetrical HBC can be derived from the LS core 103a (FIG. 2) by replacing the inductor 203 with a second switch 206b (while retaining the first switch 206a) and moving the inductor 203 between the voltage source ($V_{in}$) and the inserted switch 206a. An odd-order BVM 106 can be connected with the LSS core 103b to derive a constant output voltage. Referring to FIG. 6A, shown is an example of a third-order symmetrical HBC 403 including a third-order BVM 106.

With one more switch, the symmetrical HBC 403 overcomes the drawback of partially pulsating input current seen in the basic HBC 303 (FIG. 5A). The symmetrical HBC 403 has continuous input current with a symmetrical structure yielding strict interleaving operation feature ($V_{c1a}=V_{c1b}$). FIG. 6B shows examples of waveforms of the symmetrical HBC 403. The ripple of the output voltage ($V_{out}$) can be minimized without a significant increase in the components, when compared with a traditional interleaving method, by adding the symmetrical circuit branch. The ripple of the inductor current ($I_L$) is also smaller compared to the basic HBC 303 due to the doubled equivalent switching frequency applied to the inductor 203, leading to a reduced inductor size. Two overlapping interleaved PWM control signals (S1 and S2 shown at the top of FIG. 6B) can be used to drive the circuit.

The overlapping duty cycle $D_{ov}$ can be defined according to the following equation:

$$D_{ov}=\frac{t_{ov}}{T_s/2}, \tag{4}$$

where $t_{ov}$ is the overlapping time of two interleaved PWM control signals and $T_s$ is the switching period of each PWM control signal as shown in FIG. 6B. Assuming the duty cycle of each PWM signal is D, the relationship between D and $D_{ov}$ is given as following:

$$D_{ov}=2D-1, 0.5<D<1. \tag{5}$$

The voltage gain of the third-order symmetrical HBC 403 shown in FIG. 6A can be given by:

$$\frac{V_H}{V_L} = \frac{4}{1-D_{ov}}. \tag{6}$$

The Isolated HBC.

Figure 7A:
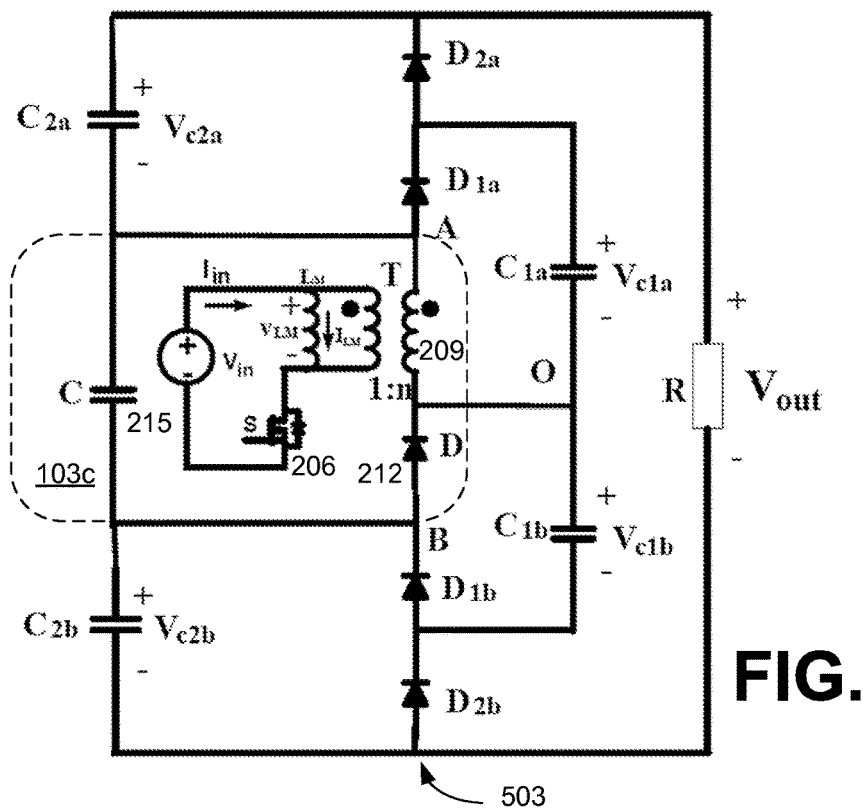
FIG. 7A is a schematic diagram illustrating an example of a second-order isolated HBC in accordance with various embodiments of the present disclosure.

In order to derive the TSD core 103c (FIG. 2) for the isolated HBC, a transformer 209 is utilized with a primary side connected to the voltage source ($V_{in}$) through the switch 206 and a secondary side that substitutes for the inductor 203 in the LS core 103a (FIG. 2). The transformer 209 has turns ratio of 1:n. The voltage source ($V_{in}$) of the LS core 103a is replaced by a capacitor (C) 215 and a diode (D) 212 is inserted in place of the switch 206. Referring to FIG. 7A, shown in an example of a second-order isolated HBC 503. With a minimal component increase from the second-order basic HBC 303 of FIG. 5A, the topology of the isolated HBC 503 can not only realize galvanic isolation between the source ($V_{in}$) and the load ($V_{out}$), but can also eliminate the need for an auxiliary magnetic resetting circuit due to its flyback-forward operation characteristic. The isolated HBC topology can be used in applications needing low power, high gain, and isolation with regulation capabilities. The voltage gain of the second-order isolated HBC 503 in CCM operation can be given by:

$$\frac{V_{out}}{V_{in}} = n\frac{3-D}{1-D}. \tag{7}$$

Figure 7B:
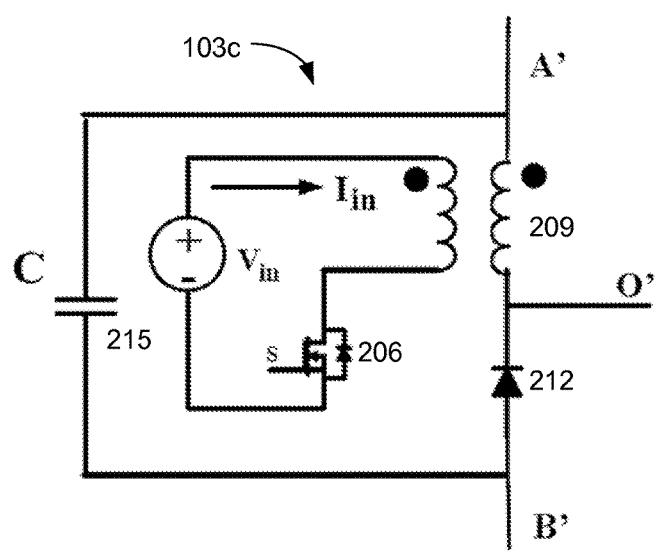
FIGS. 7B through 7E are schematic diagrams illustrating examples of transformer-switch-diode (TSD) cores that can be used in the isolated HBC of FIG. 7A in accordance with various embodiments of the present disclosure.
Figure 7C:
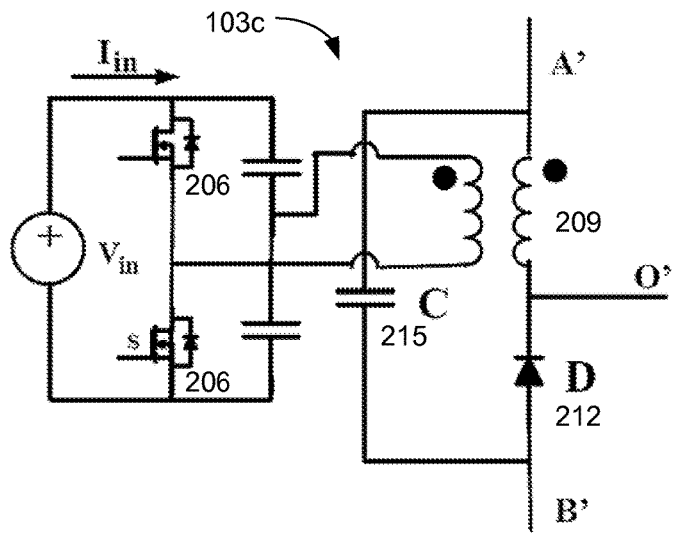
Figure 7D:
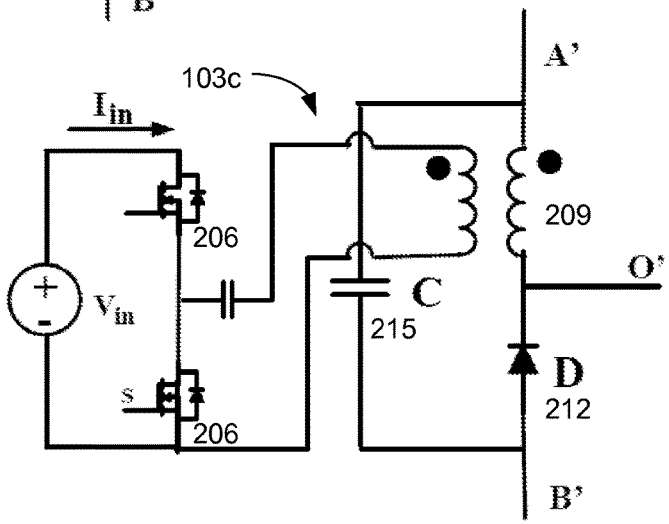
Figure 7E:
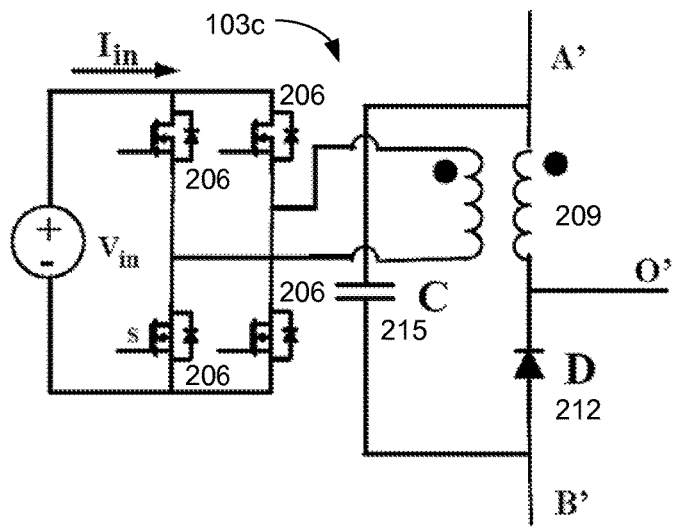

Various TSD core magnetizing circuit configurations can be utilized on the primary side of the transformer 209. FIGS. 7B through 7E illustrate four examples of TSD cores 103c. Beginning with FIG. 7B, shown is an example of the flyback TSD core illustrated in FIG. 7A. In addition, FIG. 7C shows an example of a half-bridge TSD core, FIG. 7D shows an example of a resonant TSD core, and FIG. 7E shows an example of a full-bridge TSD core using different switching configurations to supply the primary side of the transformer 209.

The tapped-inductor HBC. If the inductor 203 of a LS core 103a (FIG. 2) used in a second-order basic HBC 303 (FIG. 5A) is replaced by a tapped inductor 218 whose second winding is connected between the drain terminal of a MOSFET switch 206 and common point (O') between capacitors $C_{1a}$ and $C_{1b}$, as shown in FIG. 8A, a second-order tapped-inductor HBC 603 can be created. At least three major benefits can result from this topology:

No pulsating component will be observed in the input current due to the current limitation function of the second winding of tapped inductor 218, thus the input filter can be reduced and component stress alleviated;

Voltage gain of the converter will be dramatically enhanced; and

Pulsating charging current from $C_{1b}$ to $C_{2b}$ is eliminated, which can help reduce the current rating of the components and improve efficiency.

The voltage gain of the second-order tapped HBC 603 under CCM conditions can be given by:

$$\frac{V_{out}}{V_{in}} = n\frac{3-D+2n}{1-D}. \tag{8}$$

When n=0, the tapped inductor 218 becomes a normal inductor 203 without a second winding, then the gain of Equation (8) will be reduce to the expression of Equation (1), the same as the second-order basic HBC 303 of FIG. 5A.

Bidirectional HBC Extension

Figures 8, 9A:
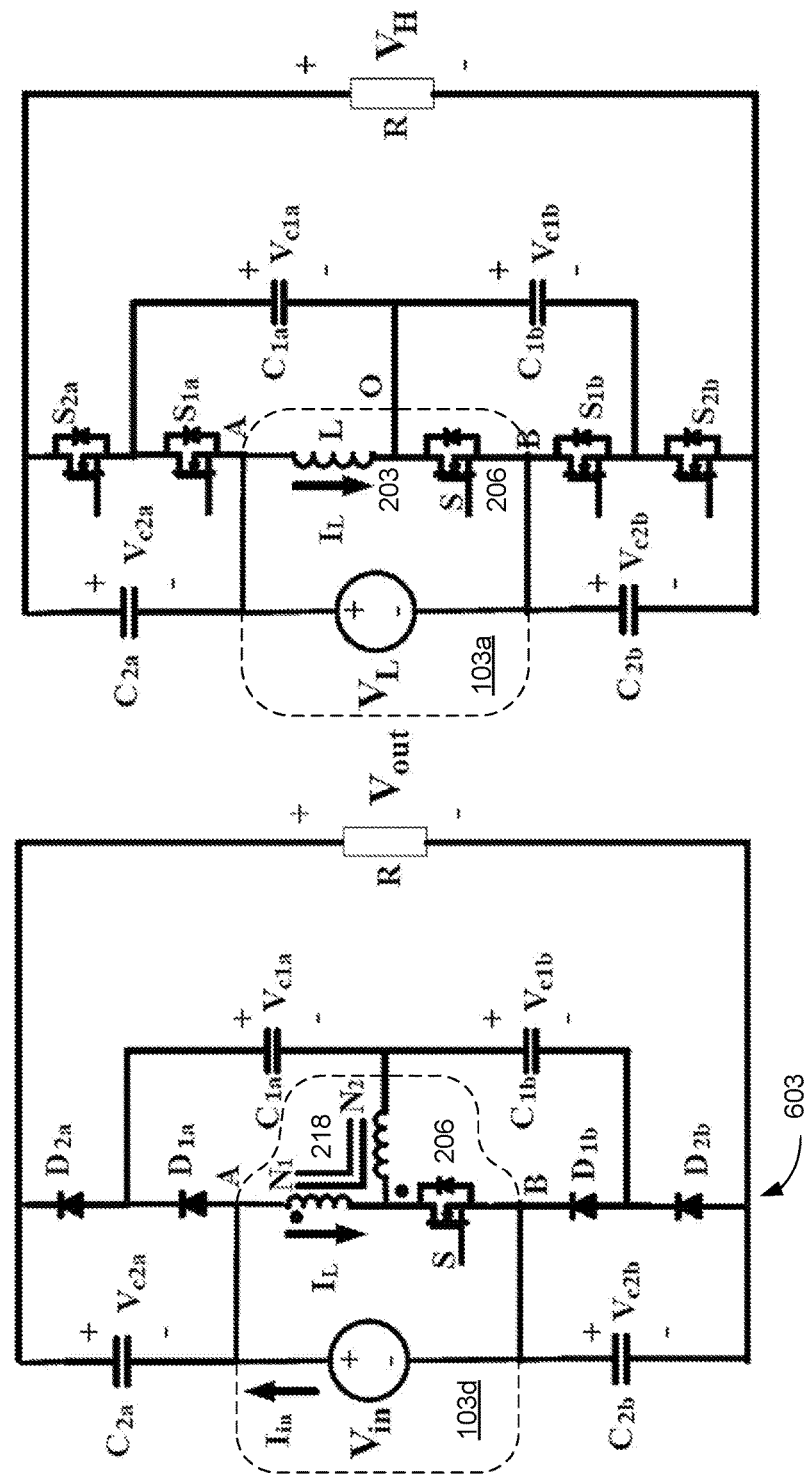
FIG. 8 is a schematic diagram illustrating an example of a second-order tapped-inductor HBC in accordance with various embodiments of the present disclosure.
FIGS. 9A and 9B are schematic diagrams illustrating examples of bidirectional HBC extensions in accordance with various embodiments of the present disclosure.
Figures 9B, 9C:
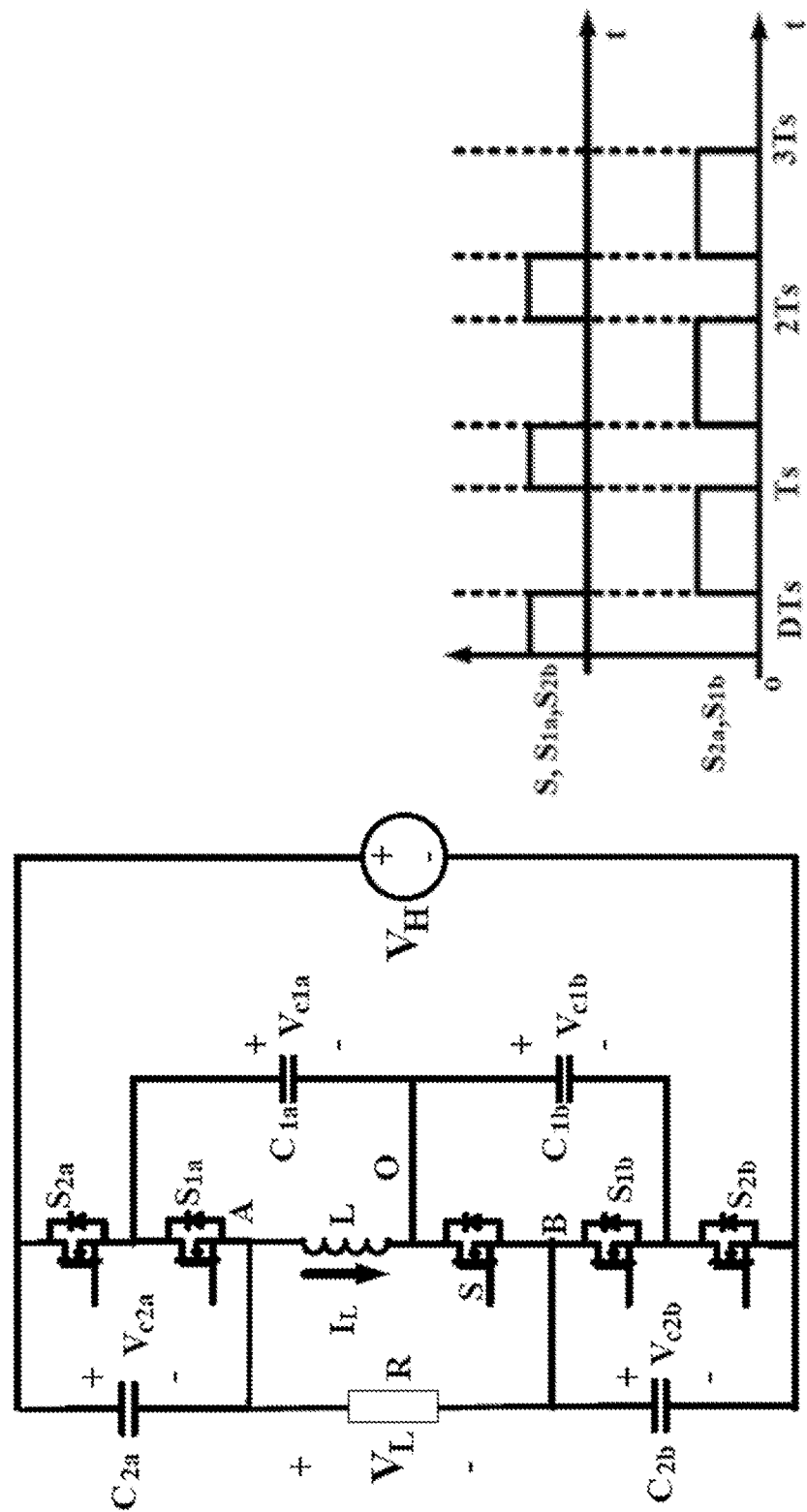
FIG. 9C illustrates switch timing of the bidirectional HBC extensions of FIGS. 9A and 9B in accordance with various embodiments of the present disclosure.

In applications such as battery storage systems, bidirectional power delivery is desirable. The HBC converters can provide a solution to realize the bidirectional functionality by replacing all the diodes ($D_{nx}$) in the BVM 106 to switches ($S_{nx}$). For example, the second-order basic HBC 303 in FIG. 5A can be extended to a bidirectional topology. FIG. 9A shows an example of a step-up configuration for power delivery from the low voltage side ($V_L$) to the high voltage side ($V_H$) and FIG. 9B shows an example of a step-down configuration for power delivery in the opposite direction ($V_H$ to $V_L$). FIG. 9C illustrates the switch control signals for the bidirectional topology. The switches S, S1a, and S2b are driven by PWM signal on the top in FIG. 9C and switches S1b and S2a are triggered by the complimentary PWM signal at the bottom in FIG. 9C.

Single-Input Three-Dimensional (3D) HBC Extension

For high power applications, a single-input 3D DC-DC converter can be utilized. A single-input three-dimensional 3D HBC includes multiple HBCs as its wings while sharing a common axis (e.g., using HBCs in FIG. 1B). The common axis includes multiple capacitors with a single input source in the middle. Each wing can include a single switch to facilitate unidirectional power flow, three switches to allow for partial bidirectional power flow, or all switches (without diodes) for fully bidirectional power flow. This type of 3D HBC is suitable for high power applications. The 3D DC-DC converters include the following aspects:

At least three parallel wings of the same or different sub-circuits;
The wings sharing the input source and output capacitors with interleaved or non-interleaved operation; and
The input source and output voltage aligned along a common axis in the 3D space.

Based on these features, members of the HBC family with even-order BVMs 106 equipped with inductive switching cores can be extended to single-input 3D DC-DC converters. Therefore, the symmetrical HBC does not include a 3D version due to the odd-order BVM 106. Since the isolated HBC cannot align the input and output voltage in a common axis, it cannot be extended to 3D converter. Thus, only even-order basic HBCs and tapped HBCs can be implemented as the single-input 3D versions. TABLE 2 summarizes the HBC topologies that can be extended to 3D.

TABLE 2

3D DC-DC converter extension options.

| Topology | Single-Input 3D Extension | Distributed Input 3D Extension |
|---|---|---|
| Basic HBC | Yes | Yes |
| Symmetrical HBC | No | Yes |
| Isolated HBC | No | Yes |
| Tapped-inductor HBC | Yes | Yes |

The 3D HBC converters offer the following advantages:
By sharing resources in the common axis, cost and volume can be reduced for high power applications;
Input and output filtering can be greatly reduced when more wings are added using interleaving operation for the wings and the natural interleaving property of the BVM structure; and
The resource sharing property along the center axis facilitates "plug and play" expansion.

The extended single-input 3D $2m^{th}$-order basic and tapped-inductor HBC topologies will now be discussed.

The Single-Input 3D Basic HBC.

Figure 10A:
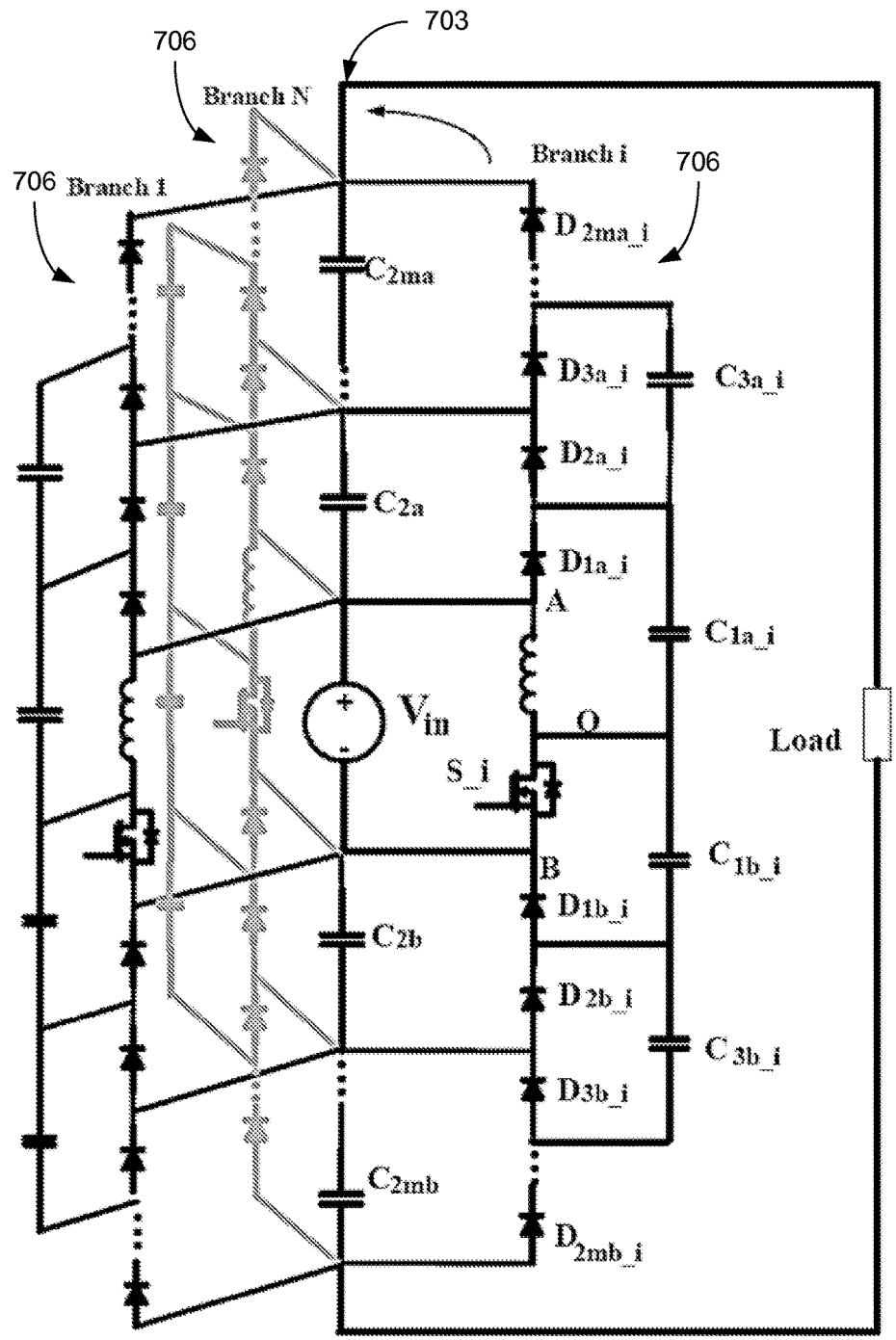

Referring to FIG. 10A, shown is an example of a 3D $2m^{th}$-order basic HBC including a common axis 703 with a power source ($V_{in}$) in the center and N symmetrical wings 706. The voltage gain under CCM conditions can be given as following:

$$\frac{V_{out}}{V_{in}} = \frac{1-D+2m}{1-D}. \qquad (9)$$

The common axis 703 and "plug and play" wing 706 are shown in FIGS. 10B and 10C, respectively. All the "plug and play" wings 706 share the resources on the common axis 703. Theoretically, an unlimited number of "plug and play" wings 706 can be added to the common axis 703 to achieve extremely high power outputs, which makes the 3D basic HBC structure attractive for high power application.

As there are N "plug and play" wings 706 in parallel and operating in an interleaved manner, the voltage ripples of the capacitors on the common axis 703 will be small compared with the ripple of the capacitors on the "plug and play" wings 706. Thus a high voltage rating output capacitor is not necessary. With the increase of system power, more wings 706 can be "plugged" into the common axis 703, leading to a smaller output ripple. FIG. 10D illustrates the control signals for switches S_i (i=1, 2, 3 . . . N). As illustrated, the switching is evenly spaced over the switching period $T_s$ to provide for the interleaved operation.

The components count of a 2 $m^{th}$-order N-wing 3D basic HBC is given in TABLE 3.

TABLE 3

Component account of $2m^{th}$-order N-wing 3D basic HBC

| Component | Common Axis 703 | Each Plug and Play Wing 706 | Wing Number | Total |
|---|---|---|---|---|
| Magnetic components | 0 | 1 | N | N |
| Capacitors | 2m | 2m | N | 2m(N + 1) |
| Switches | 0 | 1 | N | N |
| Diodes | 0 | 4m | N | 4mN |

The Single-Input 3D Tapped-Inductor HBC.

Figure 11A:
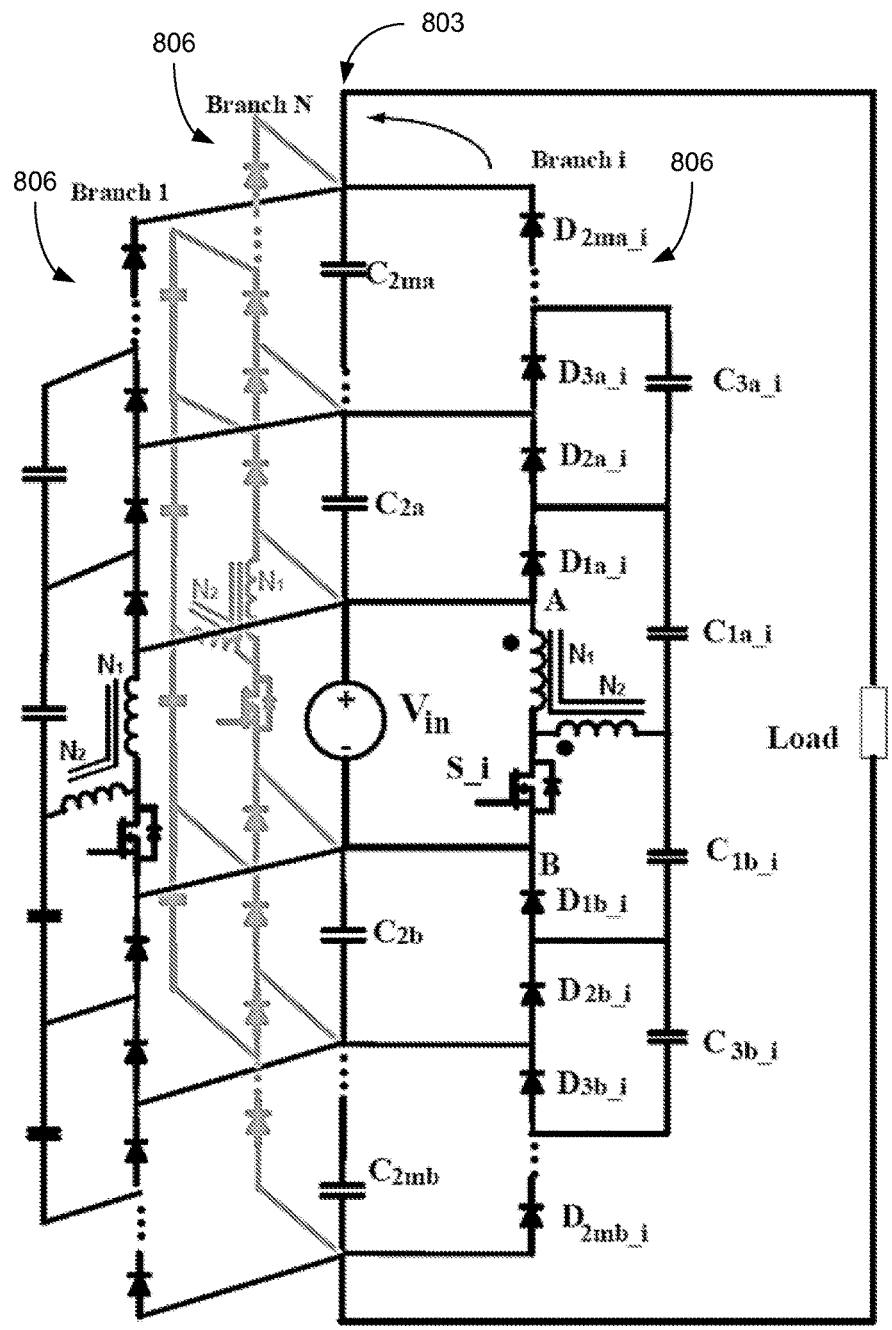
FIG. 11A is a schematic diagram illustrating an example of a 3D tapped-inductor HBC in accordance with various embodiments of the present disclosure.

If N wings 806 of a 2 $m^{th}$-order tapped-inductor HBC are connected in parallel about a common axis 803 and controlled by interleaved PWM control signals as illustrated in FIG. 10D, a high power high gain 3D tapped-inductor HBC can be derived. FIG. 11A is a graphical representation of the $2m^{th}$-order tapped-inductor HBC. Similar to the 3D basic HBC of FIG. 10A, the 3D tapped-inductor HBC topology is extremely flexible in expanding to different power levels by plugging in or deleting "plug and play" wings 806. The ripple of the output voltage ($V_{out}$) will be small due to the interleaving operation.

Figure 11B:
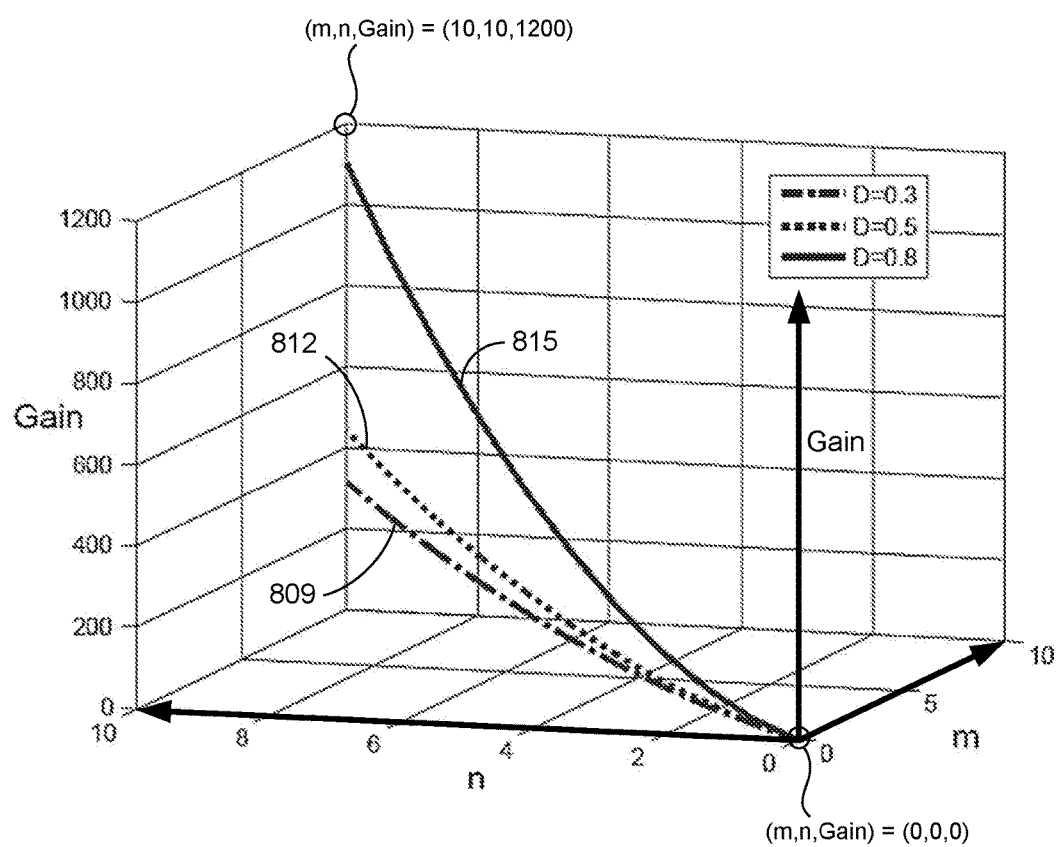
FIG. 11B illustrates the relationship of voltage gain with respect to turns ratio and BVM order of the 3D tapped-inductor HBC of FIG. 11A in accordance with various embodiments of the present disclosure.

The voltage gain of a single-input 3D $2m^{th}$-order tapped-inductor HBC with a tapped inductor 218 (FIG. 8) whose turn ratio is 1:n has following voltage conversion ratio:

$$\frac{V_{out}}{V_{in}} = 1 + \frac{(1+n)2m}{1-D}. \qquad (10)$$

Where n=N2/N1. According to the gain of equation (10), there are three degrees of freedom: m, n and D for the circuit design to meet certain gain specifications. However, higher order m needs a larger number of components, while a larger turn ratio n leads to higher leakage inductance. On the other hand, large duty cycle D at operating point may increase loss caused by the diodes' recovery. Therefore, a trade-off design can be used in high gain DC-DC applications with proper choice of m, n and D at steady state. The relationship of the voltage gain with respect to m and n is plotted in FIG. 11B, under three typical duty cycle conditions: D=0.3 (curve 809), D=0.5 (curve 812) and D=0.8 (curve 815).

Micro-Inverter Extension

Figure 12A:
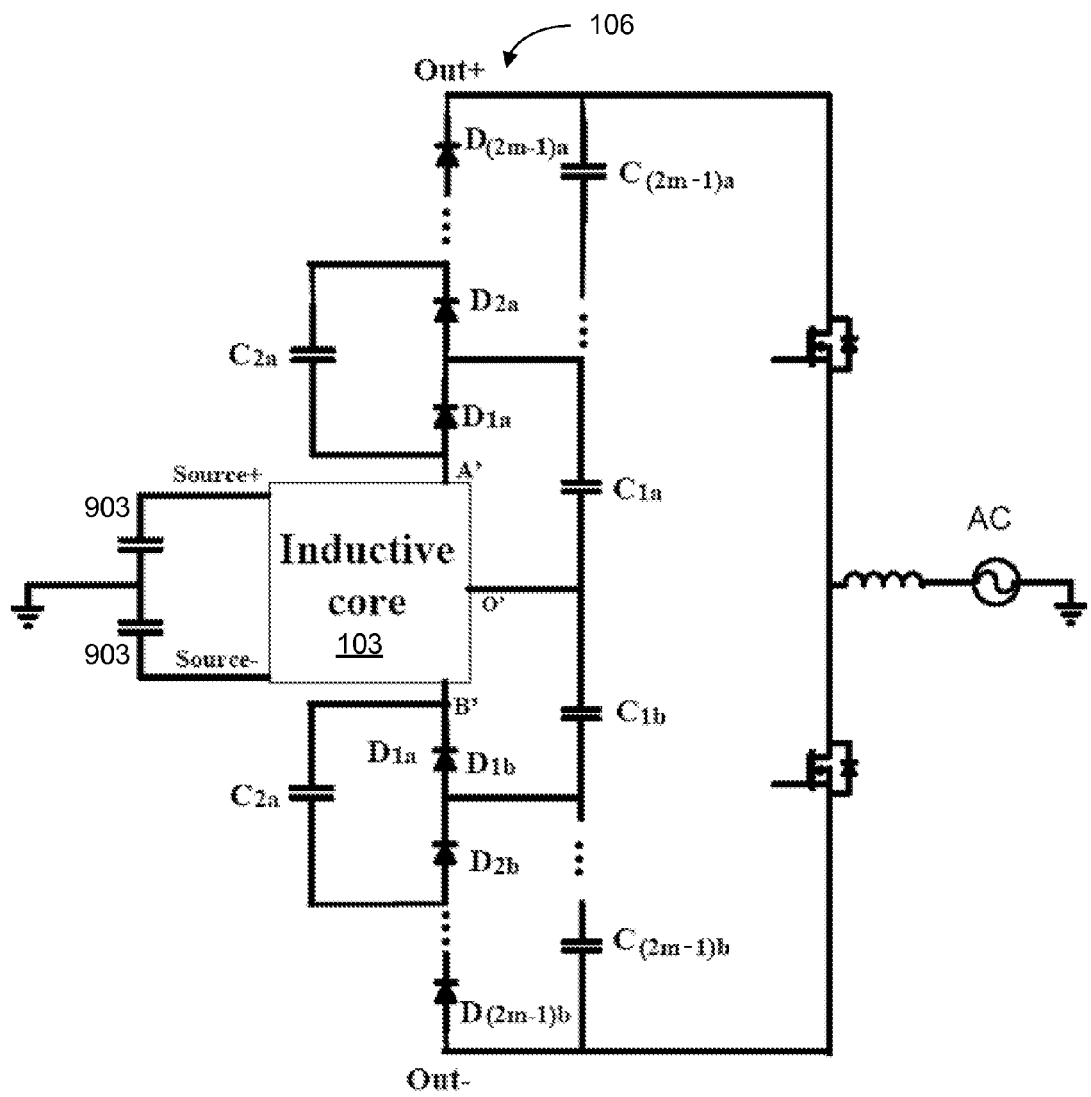
FIGS. 12A through 12C are schematic diagrams illustrating examples of micro-inverter extensions of HBCs in accordance with various embodiments of the present disclosure.
Figure 12B:
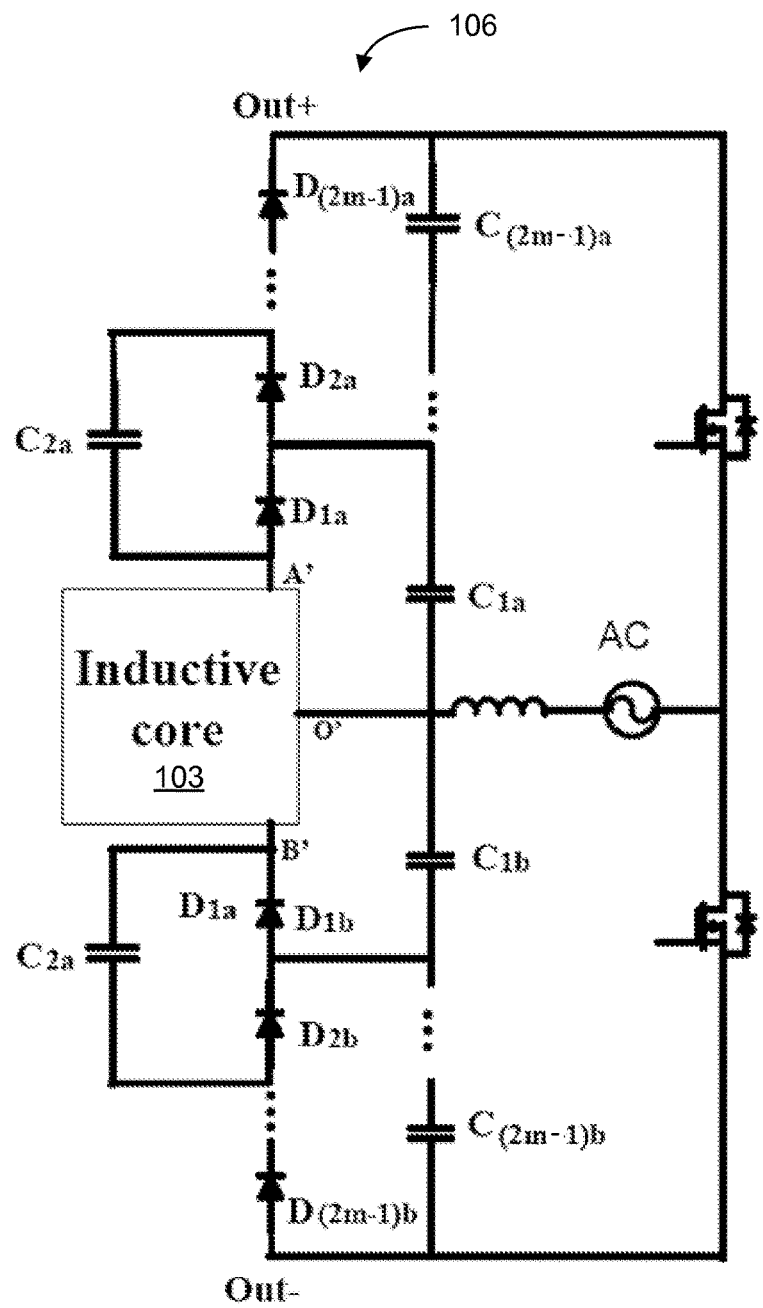

The bipolar configuration of the HBC converters can be extended to implement a half-bridge micro-inverter by making use of the cascaded flying capacitors in the HBC. FIGS. 12A and 12B illustrate two examples of the half-bridge micro-inverter topology. A central source tap configuration is shown in FIG. 12A and a central flying capacitor tap configuration is shown in FIG. 12B. The central source tap connection of FIG. 12A can be adopted in all the HBC extended micro-inverters, where the central tap is created by tapping a pair of capacitors 903 in cascade fashion with the two terminals connected to the positive and negative leads of the electric energy source ($V_{in}$) in the inductive switching core 103 (FIG. 2). The central flying capacitor tap connection of FIG. 12B can only be used in a symmetrical HBC extended micro-inverter, which has the same voltage at capacitor $C_{ia}$ and $C_{ib}$ (i=1, 3, 5 . . . 2m−1).

Figure 12C:
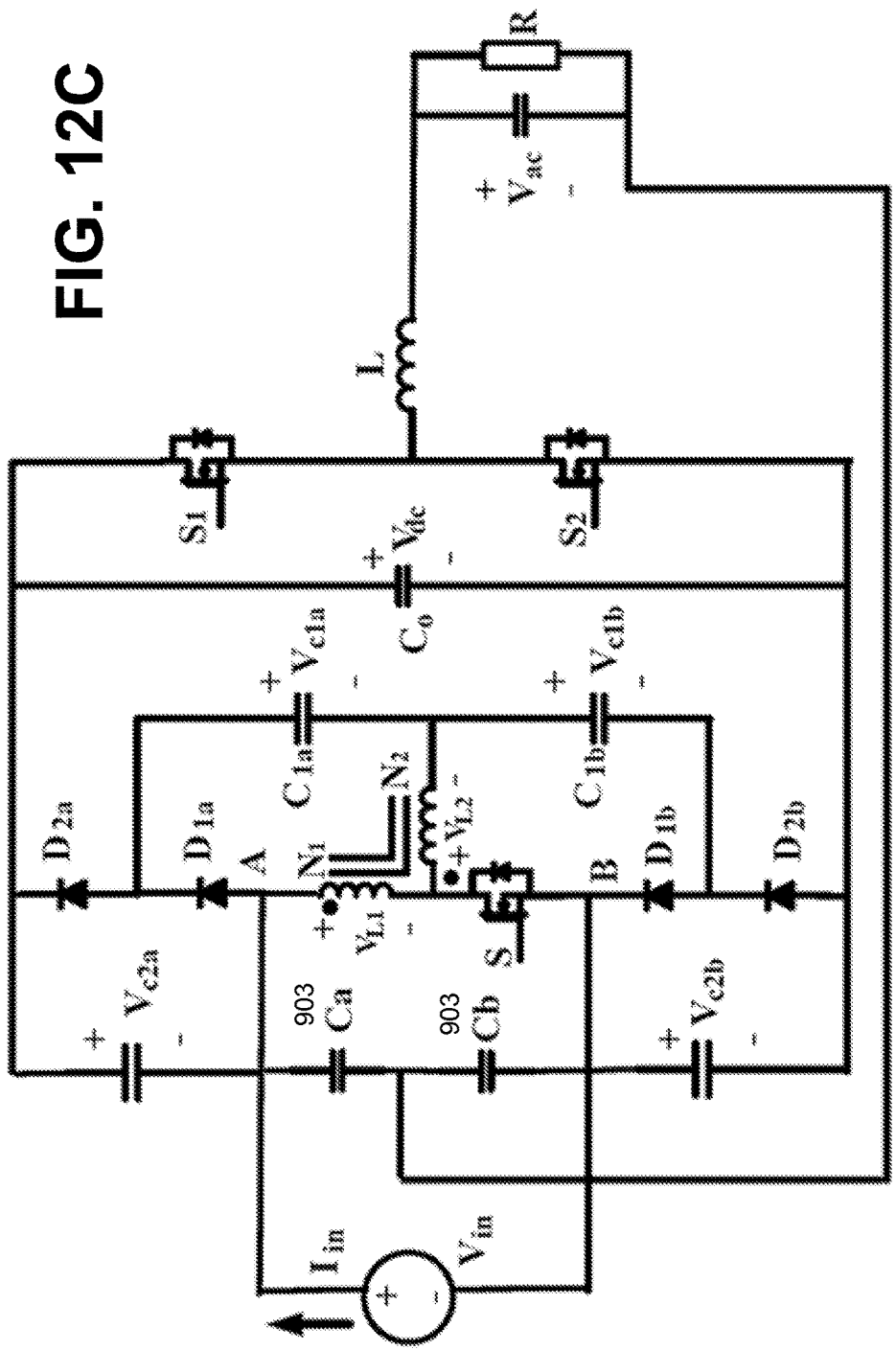
Figure 12D:
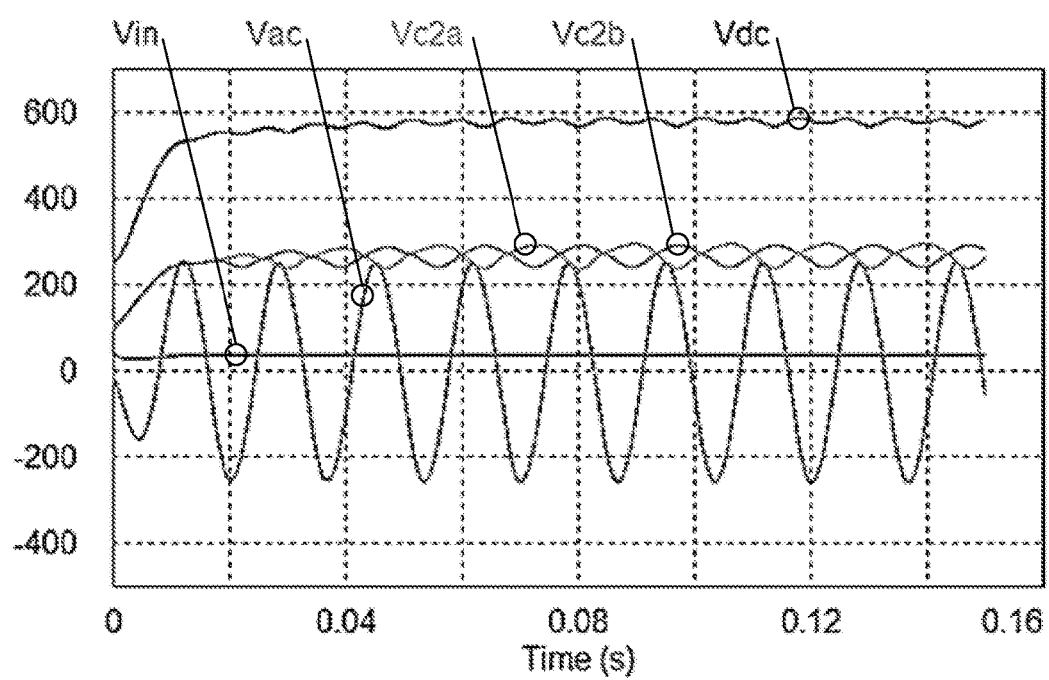
FIG. 12D illustrates various voltage waveforms of the second-order half-bridge tapped-inductor HBC micro-inverter in FIG. 12C in accordance with various embodiments of the present disclosure.

An example design of second-order half-bridge tapped-inductor HBC micro-inverter topology is given in FIG. 12C. A central tap can be created by tapping a pair of capacitors (Ca and Cb) 903 in cascade fashion across the electric energy source ($V_{in}$). FIG. 12D illustrates various voltage waveforms ($V_{in}$, $V_{ac}$, $V_{c2a}$, $V_{c2b}$, and $V_{dc}$) of the second-order half-bridge tapped-inductor HBC micro-inverter in FIG. 12C.

Distributed-Input 3D HBC Extension

For DC distribution (or DC micro-grid) applications, a distributed-input 3D converter can be realized. A distributed-input 3D HBC includes multiple HBCs as its wings while sharing a common axis. The axis contains multiple capacitors connected in series. Each wing can include an input source (which can be the same type or different types) such as, e.g. PV input, battery input, or other sources. The HBC wings in a 3D HBC can be the same or different types of inductive switching cores. Furthermore, each HBC wing can have a certain number of actives switches to control unidirectional, partial bidirectional or fully bidirectional power flow. Each of the series connected capacitors in the common axis can serve as a DC output. It is also possible for a combination of several of those capacitors to serve as a DC output. This type of 3D HBC is suitable for DC micro-grid or DC distribution applications.

Figure 13A:
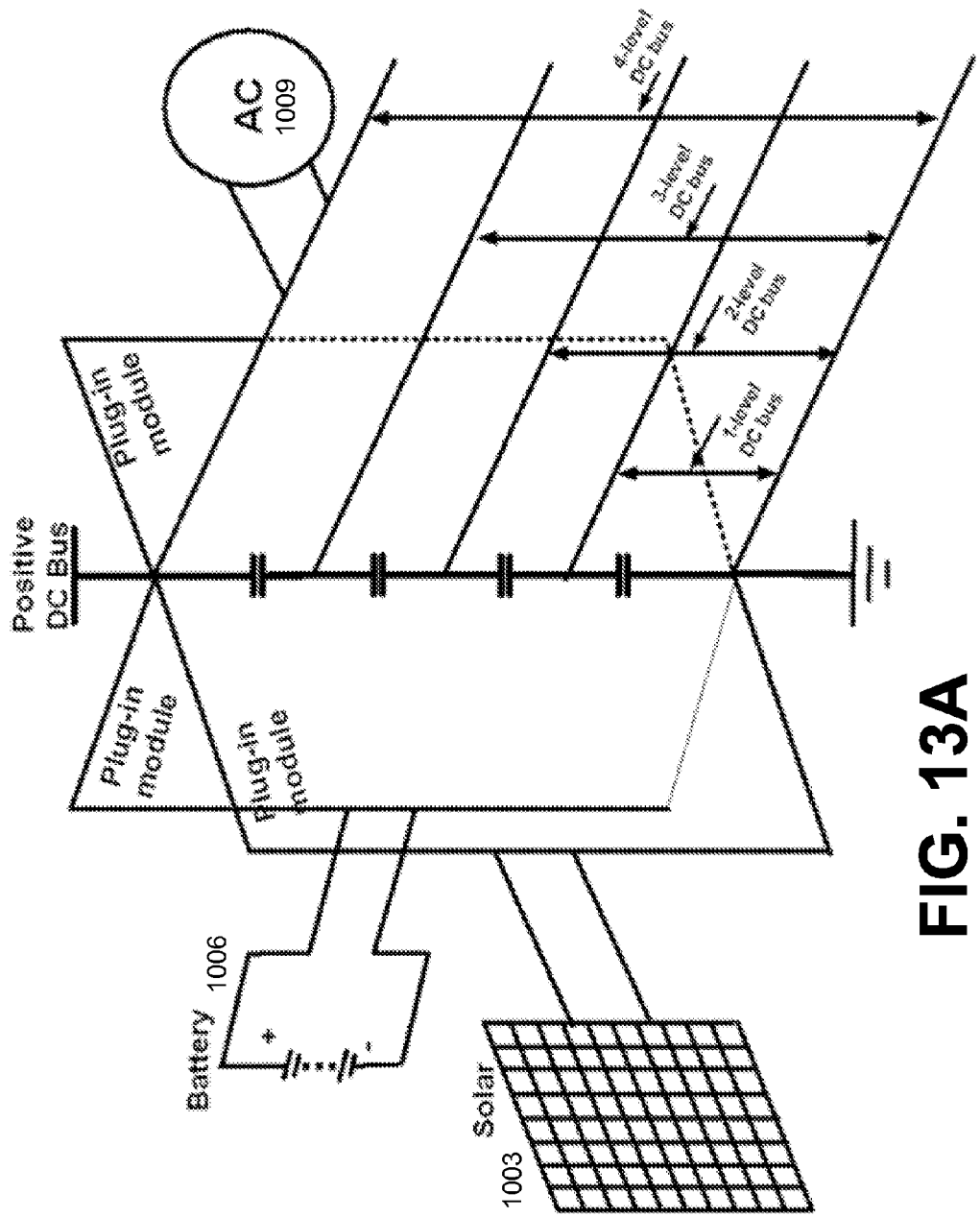
FIG. 13A is a graphical representations illustrating an example of a distributed-input 3D HBC being used in a DC micro-grid system in accordance with various embodiments of the present disclosure.

Some topologies in the HBC family can be used to implement DC micro-grid systems by using their 3D configuration. Referring to FIG. 13A, shown is an example of a 3D symmetrical HBC being used in a DC micro-grid system. The symmetrical HBC is used as an example to illustrate the plug and play infrastructure of the DC micro-grid. The DC micro-grid includes multilevel DC buses, with multiple standard plugin modules to connect power sources such as, e.g., photovoltaic (PV) panels 1003 and/or battery storage 1006, and connect DC loads directly to the multilevel DC buses or connect AC loads via AC modules 1009.

Figures 13B, 13C, 13D:
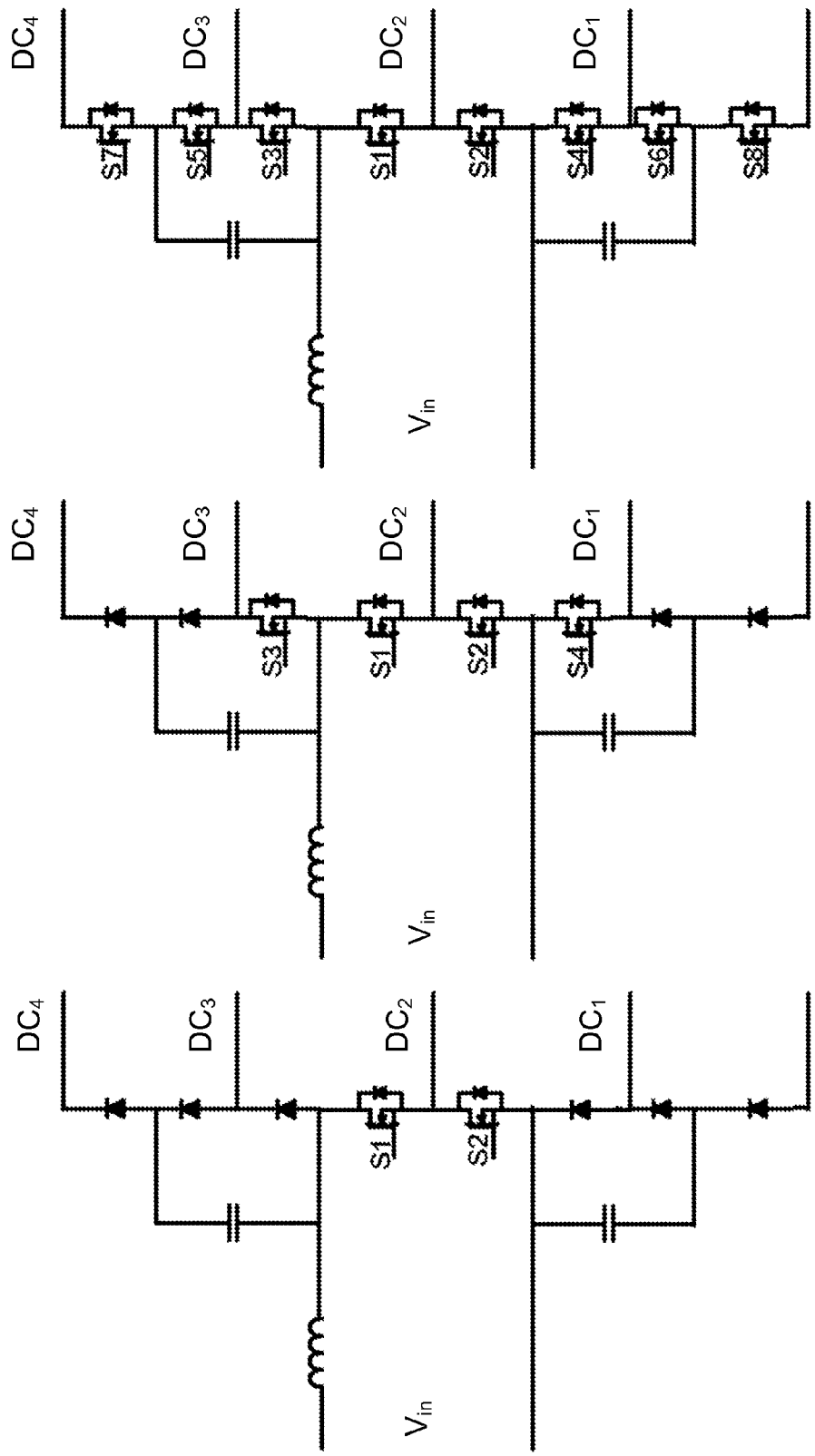
FIGS. 13B through 13D are schematic diagrams illustrating examples of plug-in modules for the distributed-input 3D HBC of FIG. 13A in accordance with various embodiments of the present disclosure.
Figure 13E:
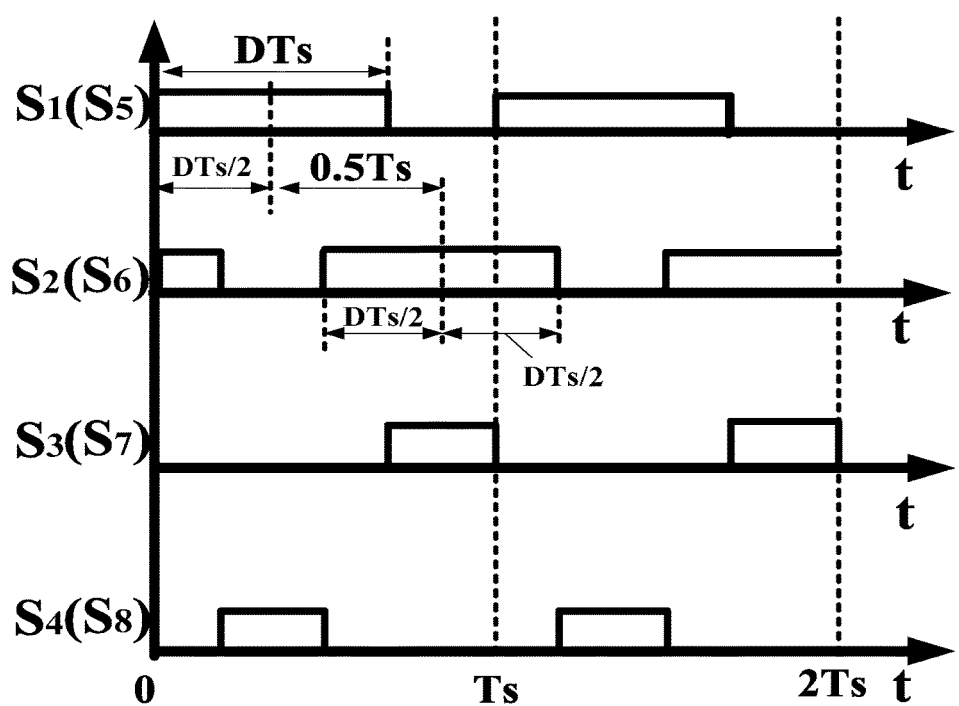
FIG. 13E illustrates examples of operational characteristics of the distributed-input 3D HBC of FIGS. 13A-13D in accordance with various embodiments of the present disclosure.

The example of FIG. 13A shows a four level DC bus topology, which can be used to illustrate the features of the 3D HBC topology. In other implementations, a different number of levels can be used (e.g., 2, 3, 5, 6, 7, . . . ) and/or a different inductive switching core can be used. FIGS. 13B through 13D show several standard plug-in modules, where the two-switch module of FIG. 13B can be used for connecting a low voltage (35-48V) PV 1006 to a high voltage DC bus (about 400V), and the four switch module of FIG. 13C or the eight-switch module of FIG. 13D can be used for connecting low voltage (35-48V) battery 1009 to the high voltage DC bus (about 400V). The associated switching patterns for two, four or eight-switch wings are illustrated in FIG. 13E. Load modules can be used to connect loads to one level (about 100V), two level (about 200V), three level (about 300V), and four level (about 400V) DC buses with direct connection or via conventional isolated unidirectional dc/dc converters for galvanic isolation. AC modules such as traditional half bridge, diode clamped multilevel topology, or three-phase inverter topologies can be used to connect the high-level dc bus to AC loads.

This DC micro-grid features a minimum number of switches and allows power flow from solar PVs 1003 to battery 1006, to all levels of the DC buses, and to AC sources; and allowing power flow from the battery 1006 to all level DC buses, to DC loads, and to AC loads. Higher voltage and/or higher levels are possible. The driving, protection, and control functions can be added to the topology for safe and effective operation. This DC micro-grid topology can achieve low cost, high efficiency, modular plug and play construction, scalable from consumer products to grid level power stabilization.

Furthermore, the capacitors at the center axis can be replaced by battery modules when the DC bus voltage is allowed to fluctuate in an acceptable range, which can enhance the system energy storage capability, improve efficiency, and provide a more stable power to the loads.

SUMMARY

A hybrid boosting converter (HBC) family with extensions of bidirectional converters, 3D high power DC-DC converters, micro inverters, and micro-grids were presented in this disclosure. The HBC includes an inductive switching core and a bipolar voltage multiplier (BVM). Based on the core characteristics, the HBCs can be classified into basic HBCs, symmetrical HBCs, isolated HBCs and tapped-inductor HBCs. The basic HBC can include traditional boost converter and BVM, featuring a single switch, simple structure and easy control. The symmetrical HBC can be characterized by its symmetrical structure, continuous input current with small current ripple, and small output voltage. The isolated HBC provides a galvanic isolation feature and continuous power delivery both at the magnetizing stage and the magnetic resetting stage. The tapped-inductor HBC tends to have ultra-high gain and good input current profile.

A bidirectional power delivery topology extension can be implemented with a modular HBC, and can be valuable in power storage system, enabling high gain, high efficiency and power bidirectional delivery functionality. The 3D DC-DC HBC converter was discussed, and can provide flexibility for power expansion. A half-bridge inverter extension can be implemented using cascaded flying capacitors of HBC converters. The modular HBCs are suitable in many DC-DC applications such as renewable energy power conversion from low voltage to high voltage, and high gain power voltage sources such as, e.g., X ray drivers, lighting ballasts, etc. The minimized components count, low component ratings, tunable voltage gain and expendable structure of HBC topologies provide solid candidates for low cost, small volume, high gain, high power and high efficiency DC-DC converters design. Moreover, the extended micro-inverter configuration is suitable for solar energy conversion with a wide maximum power point tracking range.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A hybrid boost converter (HBC), comprising:
   an inductive switching core comprising a switch having a gate terminal, a drain terminal and a source terminal, the inductive switching core comprising a first output, a second output, and a third common output; and
   a bipolar voltage multiplier (BVM) comprising a positive branch coupled at a first end to the first output and the third common output of the inductive switching core and a negative branch coupled at a first end to the second output and the third common output of the inductive switching core.

2. The HBC of claim 1, wherein the inductive switching core is an inductor-switch (LS) core comprising an inductor and the switch coupled across an input voltage ($V_{in}$), the third common output located between the inductor and the drain terminal of the switch.

3. The HBC of claim 1, wherein the inductive switching core is an inductor-double switch (LSS) core comprising an inductor, the switch and a second switch coupled across an input voltage ($V_{in}$), the third common output located between the source terminal of the switch and a drain terminal of the second switch.

4. The HBC of claim 1, wherein the inductive switching core is a transformer-switch-diode (TSD) core comprising a primary side of a transformer coupled to an input voltage ($V_{in}$) and a secondary side of the transformer coupled to the BVM, the third common output located between the secondary side of the transformer and a diode.

5. The HBC of claim 4, wherein the primary side of the transformer and the switch are coupled across the input voltage.

6. The HBC of claim 4, wherein the primary side of the transformer is coupled to the input voltage via a switched half-wave bridge.

7. The HBC of claim 4, wherein the transformer is coupled to the input voltage via a switched resonant circuit, the switched resonant circuit including the primary side of the transformer.

8. The HBC of claim 4, wherein the primary side of the transformer is coupled to the input voltage via a switched full-wave bridge.

9. The HBC of claim 1, wherein the inductive switching core is a tapped-inductor-switch (TLS) core comprising a first portion of a tapped-inductor winding and the switch coupled across an input voltage ($V_{in}$).

10. The HBC of claim 9, wherein a second portion of the tapped-inductor winding is coupled between the drain terminal of the switch and the third common output coupled to a point between the positive branch and the negative branch.

11. The HBC of claim 1, wherein the BVM comprises equal numbers of capacitors and diodes.

12. The HBC of claim 11, wherein the BVM is an odd-order BVM where the number of capacitors in the positive branch is odd and the number of capacitors in the negative branch is odd.

13. The HBC of claim 1, wherein the BVM comprises equal numbers of capacitors and switches, where the switches of the BVM do not include diodes.

14. The HBC of claim 13, wherein an input voltage (Vin) is coupled between second ends of the positive and negative branches of the BVM and a load is coupled to the inductive switching core.

15. The HBC of claim 1, wherein the BVM comprises a number (X) of capacitors, a number (Y) of diodes and a number (Z) of switches, where the number of capacitors equals the number of diodes plus the number of switches of the BVM (X=Y+Z), where X, Y and Z are non-zero.

16. A hybrid boost converter (HBC) micro-inverter, comprising:
   an inductive switching core coupled to an input voltage, the inductive switching core comprising a switch having a gate terminal, a drain terminal and a source terminal, the inductive switching core comprising a first output, a second output, and a third common output;
   a bipolar voltage multiplier (BVM) comprising a positive branch coupled at a first end to the first output and the third common output of the inductive switching core and a negative branch coupled at a first end to the second output and the third common output of the inductive switching core; and
   a switched bridge coupled across second ends of the positive and negative branches of the BVM.

17. The HBC micro-inverter of claim 16, further comprising a series of capacitors coupled across the input voltage.

18. The HBC micro-inverter of claim 16, wherein the inductive switching core is an inductor-switch (LS) core comprising an inductor and the switch coupled across an input voltage ($V_{in}$), the third common output located between the inductor and the drain terminal of the switch.

19. The HBC micro-inverter of claim 16, wherein the inductive switching core is an inductor-double switch (LSS) core comprising an inductor, a first switch and a second switch coupled across an input voltage ($V_{in}$), the third common output located between the source terminal of the switch and a drain terminal of a second switch.

20. The HBC micro-inverter of claim 16, wherein the inductive switching core is a transformer-switch-diode (TSD) core comprising a primary side of a transformer coupled to an input voltage ($V_{in}$) and a secondary side of the transformer coupled to the BVM, the third common output located between the secondary side of the transformer and a diode.

21. The HBC micro-inverter of claim 16, wherein the inductive switching core is a tapped-inductor-switch (TLS) core comprising a first portion of a tapped-inductor winding and the switch coupled across an input voltage ($V_{in}$), and a second portion of the tapped-inductor winding is coupled between the switch and the third common output coupled to a point between the positive branch and the negative branch.

* * * * *